US012581358B2

(12) United States Patent
Xiang et al.

(10) Patent No.: US 12,581,358 B2
(45) Date of Patent: Mar. 17, 2026

(54) PRIVATE NETWORK CONGESTION CONTROL DURING ONBOARDING AND PROVISIONING

(71) Applicant: Huawei Technologies Co., Ltd., Shenzhen (CN)

(72) Inventors: Zhixian Xiang, Frisco, TX (US); Mazin Al-Shalash, Frisco, TX (US)

(73) Assignee: FutureWei Technologies, Inc., Addison, TX (US)

( * ) Notice: Subject to any disclaimer, the term of this patent is extended or adjusted under 35 U.S.C. 154(b) by 327 days.

(21) Appl. No.: 18/351,092

(22) Filed: Jul. 12, 2023

(65) Prior Publication Data

US 2023/0354095 A1     Nov. 2, 2023

Related U.S. Application Data

(63) Continuation of application No. PCT/US2022/012531, filed on Jan. 14, 2022.

(60) Provisional application No. 63/138,245, filed on Jan. 15, 2021.

(51) Int. Cl.
H04W 28/02 (2009.01)
H04W 48/02 (2009.01)
H04W 48/16 (2009.01)
H04W 48/18 (2009.01)

(52) U.S. Cl.
CPC ....... H04W 28/0289 (2013.01); H04W 48/02 (2013.01); H04W 48/16 (2013.01); H04W 48/18 (2013.01)

(58) Field of Classification Search
CPC . H04W 28/0289; H04W 48/02; H04W 48/16; H04W 48/18; H04W 8/04
See application file for complete search history.

(56) References Cited

U.S. PATENT DOCUMENTS

| | | | | |
|---|---|---|---|---|
| 2021/0058784 A1* | 2/2021 | Kedalagudde | ........ | H04W 76/12 |
| 2022/0330022 A1* | 10/2022 | Kolekar | ................ | H04W 12/71 |
| 2023/0075285 A1* | 3/2023 | Jung | ..................... | H04W 48/18 |
| 2023/0363055 A1* | 11/2023 | Li | ......................... | H04W 76/40 |
| 2024/0306083 A1* | 9/2024 | Vangala | ................ | H04W 60/04 |
| 2024/0323769 A1* | 9/2024 | Chai | ..................... | H04W 12/06 |

OTHER PUBLICATIONS

International Search Report and Written Opinion dated Apr. 22, 2022, International Application No. PCT/US2022/012531.

(Continued)

*Primary Examiner* — Gary Mui
*Assistant Examiner* — Yewon Kim

(57) ABSTRACT

A system and method for reducing congestion in onboarding networks before onboarding and provisioning connections are made by user equipment (UE), and for reducing congestion in onboarding networks after attempts are made by UEs to make connections to onboarding networks for onboarding and provisioning which result in network congestion. Broadcast information (referred to herein as "onboarding access control information") from a radio access network (RAN) to user equipment (UE) is used in order to guide onboarding UEs to detect and access the right onboarding network to prevent unnecessary network access attempts by UEs which are not authorized to access an onboarding network for onboarding.

17 Claims, 16 Drawing Sheets

(56)                References Cited

OTHER PUBLICATIONS

"3rd Generation Partnership Project; Technical Specification Group Services and System Aspects; Study on enhanced support of non-public networks (Release 17)", Nov. 2020, pp. 1-248.

Ericsson "UE onboarding", 3GPP TSG-RAN WG2 #113e; R2-2100491, Electronic meeting, Jan. 25, 2021-Feb. 5, 2021, pp. 1-8.

Mediatek Inc. "KI #4, New Sol: Onboarding of UEs without any credentials", SA WG2 Meeting #139E, S2-2004055, Jun. 1-12, 2020, pp. 1-4.

International Preliminary Report on Patentability dated Jul. 27, 2023, International Application No. PCT/US2022/012531.

3GPP TR 23.700-07 V1.2.0 (Nov. 2020), 3rd Generation Partnership Project; Technical Specification Group Services and System Aspects; Study on enhanced support of non-public networks (Release 17), total 244 pages.

Ericsson, UE onboarding, 3GPP TSG-RAN WG2 #113e, Electronic meeting, Jan 25-Feb. 5, 2021, R2-2100491, total 7 pages.

* cited by examiner

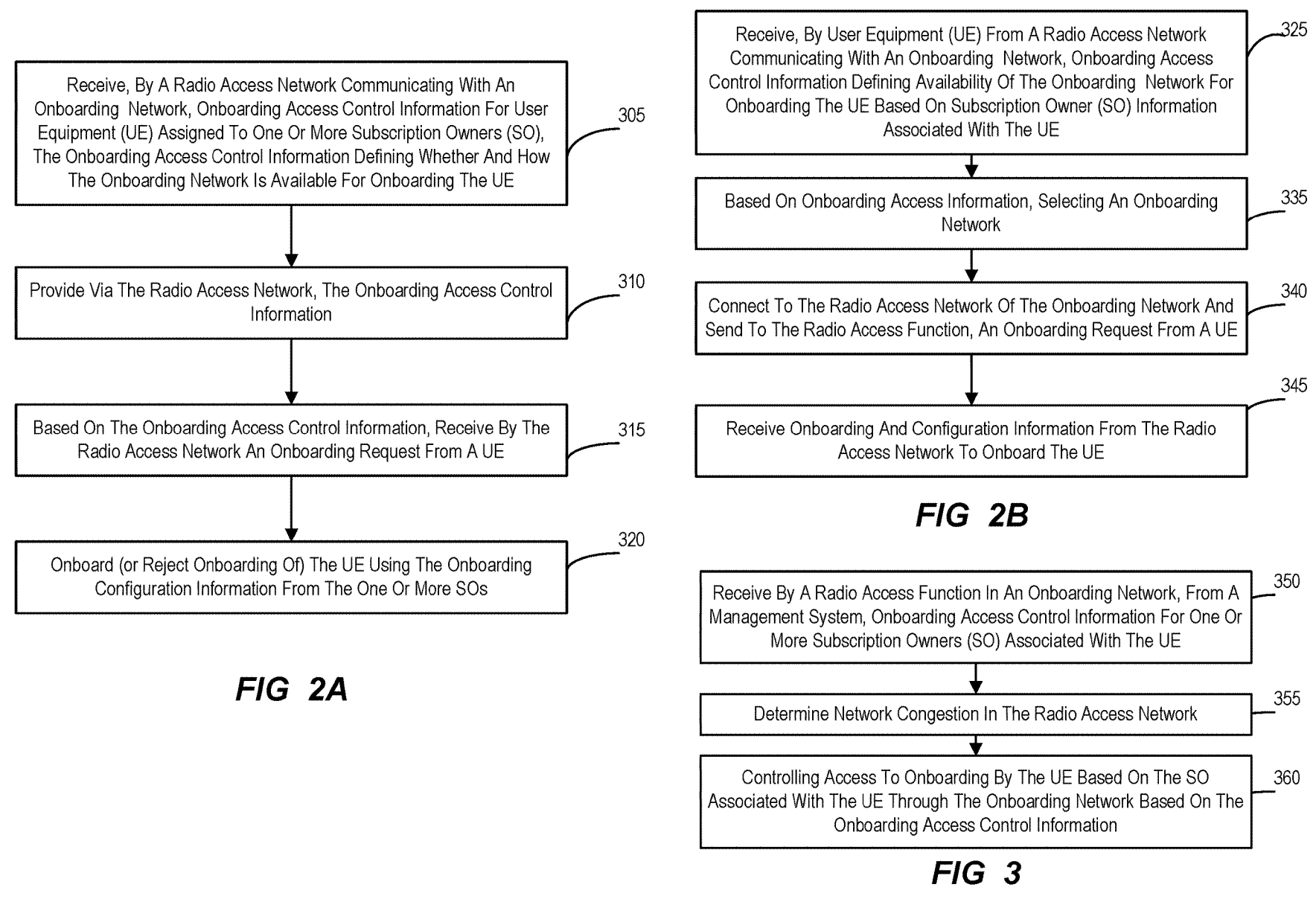

Receive, By User Equipment (UE) From A Radio Access Network Communicating With An Onboarding Network, Onboarding Access Control Information Defining Availability Of The Onboarding Network For Onboarding The UE Based On Subscription Owner (SO) Information Associated With The UE — 325

Based On Onboarding Access Information, Selecting An Onboarding Network — 335

Connect To The Radio Access Network Of The Onboarding Network And Send To The Radio Access Function, An Onboarding Request From A UE — 340

Receive Onboarding And Configuration Information From The Radio Access Network To Onboard The UE — 345

FIG 2B

Receive By A Radio Access Function In An Onboarding Network, From A Management System, Onboarding Access Control Information For One Or More Subscription Owners (SO) Associated With The UE — 350

Determine Network Congestion In The Radio Access Network — 355

Controlling Access To Onboarding By The UE Based On The SO Associated With The UE Through The Onboarding Network Based On The Onboarding Access Control Information — 360

FIG 3

Receive, By A Radio Access Network Communicating With An Onboarding Network, Onboarding Access Control Information For User Equipment (UE) Assigned To One Or More Subscription Owners (SO), The Onboarding Access Control Information Defining Whether And How The Onboarding Network Is Available For Onboarding The UE — 305

Provide Via The Radio Access Network, The Onboarding Access Control Information — 310

Based On The Onboarding Access Control Information, Receive By The Radio Access Network An Onboarding Request From A UE — 315

Onboard (or Reject Onboarding Of) The UE Using The Onboarding Configuration Information From The One Or More SOs — 320

FIG 2A

PRIVATE NETWORK CONGESTION CONTROL DURING ONBOARDING AND PROVISIONING

CLAIM OF PRIORITY

This application is a continuation of, and claims priority to, PCT Patent Application No. PCT/US2022/012531, entitled "PRIVATE NETWORK CONGESTION CONTROL DURING ONBOARDING AND PROVISIONING", filed Jan. 14, 2022, which claims priority to U.S. Provisional Patent Application No. 63/138,245, entitled "NEW MECHANISM FOR PRIVATE NETWORK CONGESTION CONTROL FOR UE ONBOARDING AND PROVISIONING", filed Jan. 15, 2021, which applications are incorporated by reference in their entirety.

FIELD

The disclosure generally relates to reducing congestion during the onboarding user equipment to Fifth Generation networks.

BACKGROUND

A Non-Public Network (NPN) is a Fifth Generation System (5GS) deployed for non-public use. An NPN may be deployed as a Stand-alone Non-Public Network (SNPN) or a Public Network Integrated NPN (PNI-NPN). An SNPN is operated by an NPN operator and does not rely on network functions provided by a Public Land Mobile Network (PLMN). The system architecture and solutions to support UE onboarding and provisioning for NPNs have not yet been defined or developed.

Onboarding and provisioning are the processes by which a user device or user equipment (UE) gains access to a network for the first time. In a mobile private network deployment, onboarding and provisioning allows a UE to be configured with the credentials and configuration for the network. Each NPN must support UE onboarding and provisioning. A new UE may only have credentials provided by a device manufacturer, which may be referred to as "manufacturer credentials" or "default UE credentials". Such a UE is not provisioned with credentials required to access either the NPN or the future home network of the UE.

In some situations, an NPN to which a UE connects to perform onboarding and provisioning may or may not be the same network which owns a particular UE's subscription. In such cases, a UE may get network connectivity to an Onboarding SNPN (O-SNPN) so that it can be provisioned with necessary subscription credentials and configuration for the Subscription Owner (SO)-SNPN that will own the UE's subscription. It is desirable to the service providers that those devices can be onboarded and provisioned via a partner's network when devices are in the partner's coverage area.

An onboarding SNPN can provides the UE with temporary connectivity to a provisioning server so that the UE can be provisioned with necessary network credentials and configuration for the service provider that will own the UE's subscription (i.e., (SO)). The SO is an entity that stores, and as result of the UE Onboarding procedures provides, the subscription data and optionally other configuration information via a provisioning server to the UE.

In some NPN use cases, network congestion may result when a large number of UEs attempt to an NPN. For example, congestion can occur when a large number of IoT devices from different SOs attempt to access an onboarding SNPN at the same time for onboarding and provisioning. For example, these devices can be new devices arriving in factories, or news crew devices arriving large news events. Simultaneously onboarding and provisioning those large number of devices can cause the congestion in the O-SNPN or may worsen the congestion if the network is already congested.

SUMMARY

One general aspect includes a computer implemented method of reducing congestion in a non-public network during an onboarding process. The computer implemented method includes receiving by a radio access network belonging to the onboarding network and from a management system, onboarding access control information for user equipment (UE) assigned to one or more subscription owners (SO), the onboarding access control information defining whether and how the onboarding network is available for onboarding the UE. The method also includes providing to the UE via the radio access network, the onboarding access control information. The method also includes based on the onboarding access control information, receiving by the radio access network an onboarding request from a UE. The method also includes rejecting or onboarding the UE using onboarding access control information. Other embodiments of this aspect include corresponding computer systems, apparatus, and computer programs recorded on one or more computer storage devices, each configured to perform the actions of the methods.

Optionally, embodiments may include the computer implemented method where the onboarding access control information is associated with each of the one or more SOs or comprises common access control information for all SOs. Optionally, embodiments may include any of the foregoing computer implemented methods where the onboarding network may include a public land mobile network (PLMN) enabling remote provisioning for a registered UE, or an onboarding non-public network. Optionally, embodiments may include any of the foregoing computer implemented methods where wherein the SO comprises a credential holding entity which authenticates and authorizes access to an onboarding network. Optionally, embodiments may include any of the foregoing computer implemented methods where the onboarding access control information may include a list of one or more SOs supported by the onboarding network for onboarding. Optionally, embodiments may include any of the foregoing computer implemented methods where the onboarding network supports onboarding UEs for one or more groups of SOs and where the onboarding access control information may include an indication of the one or more groups of SOs. Optionally, embodiments may include any of the foregoing computer implemented methods where indication may include a group identifier for onboarding, and where the UE contains configuration information including a group identifier for an SO associated with the UE which the UE may use to select the onboarding network that broadcast the same onboarding group identifier. Optionally, embodiments may include any of the foregoing computer implemented methods where the broadcasting via a system information base packet. Optionally, embodiments may include any of the foregoing computer implemented methods where the onboarding access control information may include both a list of one or more SOs supported by the onboarding network for onboarding, and where the onboarding network supports onboarding UEs for one or more groups of SOs and where the onboarding access control information may include one or more group identifiers for the one or more groups of SOs. Optionally, embodiments may include any of the foregoing computer implemented methods where the onboarding access control information may include a list of one or more SOs are not supported by the onboarding network for onboarding and the method includes: receiving a registration request from a UE for onboarding, rejecting the registration request from the UE, and broadcasting an indication that onboarding for an SO associated with the UE is not supported or adding the SO to a non-support onboarding list. Optionally, embodiments may include any of the foregoing computer implemented methods where the onboarding access control information may include unified access control (UAC) information for an onboarding category, the information indicating the UE is barred from accessing the onboarding network if services requested by the UE belong to the onboarding category. The onboarding category is standardized. Optionally, embodiments may include any of the foregoing computer implemented methods where the onboarding category is defined by the onboarding network, and the onboarding network broadcasts the defined onboarding category id for receipt and use by the UE for onboarding. Optionally, embodiments may include any of the foregoing computer implemented methods where the onboarding access control information includes an onboarding wait time for the UE, and where the method further includes re-trying onboarding following the wait time. Optionally, embodiments may include any of the foregoing computer implemented methods where the onboarding access control information includes different wait times for each of the one or more SOs. The onboarding access control information may include an indication of temporary disabling of onboarding capability by the onboarding network with a reason code for the onboarding network. Optionally, embodiments may include any of the foregoing computer implemented methods where the providing includes broadcasting via a broadcast system information base packet. Optionally, embodiments may include any of the foregoing computer implemented methods where the indication is received via a unicast control message from a network function. Implementations of the described techniques may include hardware, a method or process, or computer software on a computer-accessible medium.

One general aspect includes a method of reducing congestion in a non-public network. The method includes receiving, by user equipment (UE) from a radio access network communicating with an onboarding network, onboarding access control information defining availability of the onboarding network for onboarding the UE. The method also includes, based on the onboarding access control information, selecting an onboarding network which allows onboarding for the UE.

Other embodiments of this aspect include corresponding computer systems, apparatus, and computer programs recorded on one or more computer storage devices, each configured to perform the actions of the methods.

Optionally, embodiments of the method may include a method where the method where the onboarding access control information can be associated with each subscription owner (SO) or a common access control information for all SOs. Optionally, embodiments may include any of the foregoing methods where the onboarding network may include a public land mobile network (PLMN) enabling remote provisioning for a registered UE, or an onboarding non-public network. Optionally, embodiments may include any of the foregoing methods where the onboarding access control information may include a list of one or more SOs supported by the onboarding network for onboarding. Optionally, embodiments may include any of the foregoing methods where the onboarding network supports onboarding UEs for one or more groups of SOs and where the onboarding access control information may include an indication of the one or more groups of SOs. Optionally, embodiments may include any of the foregoing methods where the indication may include a group identifier, and where the UE contains default configuration information including a group identifier for an SO associated with the UE which the UE may use to select the onboarding network that broadcast the same onboarding group identifier. Optionally, embodiments may include any of the foregoing methods where prior to sending, the UE matches an SO identified in default configuration parameters in the UE with one or more of the SOs in the list of one or more SOs or the group id. Optionally, embodiments may include any of the foregoing methods where the UE does not match an SO identified in default configuration parameters in the UE with one or more of the SOs in the list of one or more SOs or the group id, the UE listens for other non-public networks. Optionally, embodiments may include any of the foregoing methods where the onboarding access control information may include both a list of one or more SOs supported by the onboarding network for onboarding, and where the onboarding network supports onboarding UEs for one or more groups of SOs and where the onboarding access control information may include one or more group identifiers for the one or more groups of SOs. Optionally, embodiments may include any of the foregoing methods where the onboarding access control information may include a list of one or more SOs supported by the onboarding network for onboarding and the method includes:

abandoning an attempt to access an onboarding network if the UE's SO is in the list and selecting a new onboarding network which supports onboarding for the UE's SO. Optionally, embodiments may include any of the foregoing methods where the onboarding access control information may include unified access control (UAC) information for an onboarding category, the information indicating the UE is barred from accessing the onboarding network if services requested by the UE belong to the onboarding category. Optionally, embodiments may include any of the foregoing methods where the onboarding category is standardized. Optionally, embodiments may include any of the foregoing methods where the onboarding category is defined by the onboarding network, and the onboarding network broadcasts the defined onboarding category id for receipt and use by the UE for onboarding. Optionally, embodiments may include any of the foregoing methods where the onboarding access control information includes an onboarding wait time for the UE, and where the method further includes re-trying onboarding following the wait time. Optionally, embodiments may include any of the foregoing methods where the onboarding access control information includes different wait times for each of the one or more SOs. Optionally, embodiments may include any of the foregoing methods where the onboarding access control information may include an indication of temporary disabling of onboarding capability by the onboarding network with a reason code for the onboarding network. Optionally, embodiments may include any of the foregoing methods where the indication is received via a system information base packet.

One general aspect includes a method of reducing congestion in a non-public network during onboarding of user equipment (UE). The method includes receiving by a radio access function in an onboarding non-public network, from a management system, onboarding access control information for one or more subscription owners (SO) associated with the UE. The method also includes determining by radio access network on network congestion in the radio access network. The method also includes controlling access to onboarding by the UE based on the SO associated with the UE through the onboarding non-public network based on the onboarding access control information.

Optionally, embodiments may include a method where the onboarding access control information may include a list of one or more SOs which are temporarily prevented from onboarding. Optionally, embodiments may include any of the foregoing methods where the method further includes receiving different wait times for each of the one or more SOs. Optionally, embodiments may include any of the foregoing methods where the onboarding access control information includes a prioritized list of the one or more SOs, and the controlling may include receiving an acceptance or rejection of an onboarding request based on the prioritized list.

One general aspect includes a processing system in a radio access network. The processing system includes a processor readable storage medium; a processor device including a first non-transitory memory storage may include instructions; and one or more first processors in communication with the memory, where the one or more first processors execute the instructions to: receive by the radio access network of an onboarding network and from a management system, onboard access control information for user equipment (UE) assigned to one or more subscription owners (SO), the onboard access control information defining whether the onboarding network is available for onboard the UE; broadcast via the radio access network, the onboard access control information; based on the onboard access control information, receiving by the radio access network an onboard request from the UE; and onboard the UE using the onboarding configuration information.

Another general aspect includes a user equipment device. The user equipment device includes a processor readable storage medium; a processor device including a first non-transitory memory storage may include instructions; and one or more first processors in communication with the memory, where the one or more first processors execute the instructions to: receive, by the user equipment from a radio access network communicating with an onboarding network, onboard access control information defining availability of the onboarding network for onboarding the UE based on subscription owner (SO) information associated with the UE; based on the onboard access control information, connect to the radio access network, and request onboard and configuration data for the SO via the onboard non-public network; send, to the radio access network, an onboard request from the UE; and receive onboard and configuration information from the radio access network to onboard the UE us the onboard configuration information.

Yet another general aspect includes a processing device in a radio access network. The processing device includes a processor readable storage medium; a processor device including a first non-transitory memory storage may include instructions; and one or more first processors in communication with the memory, where the one or more first processors execute the instructions to: receive by the processing device from a management system in an onboarding network, onboarding access control information for one or more subscription owners (SO) associated with a user equipment (UE); determine network congestion in the radio access network; and control access to onboarding by the UE based on the SO associated with the UE through the onboarding network based on the onboarding access control information.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

BRIEF DESCRIPTION OF THE DRAWINGS

Aspects of the present disclosure are illustrated by way of example and are not limited by the accompanying figures for which like references indicate the same or similar elements.

FIG. 2A illustrates a method performed by an onboarding Stand Alone Non-Public Network.

FIG. 2B illustrates a method performed by a UE for onboarding in the system of FIG. 1B.

FIG. 3 illustrates a general method for network control of onboarding to reduce congestion after a network congestion occurs.

DETAILED DESCRIPTION

Figure 1A:
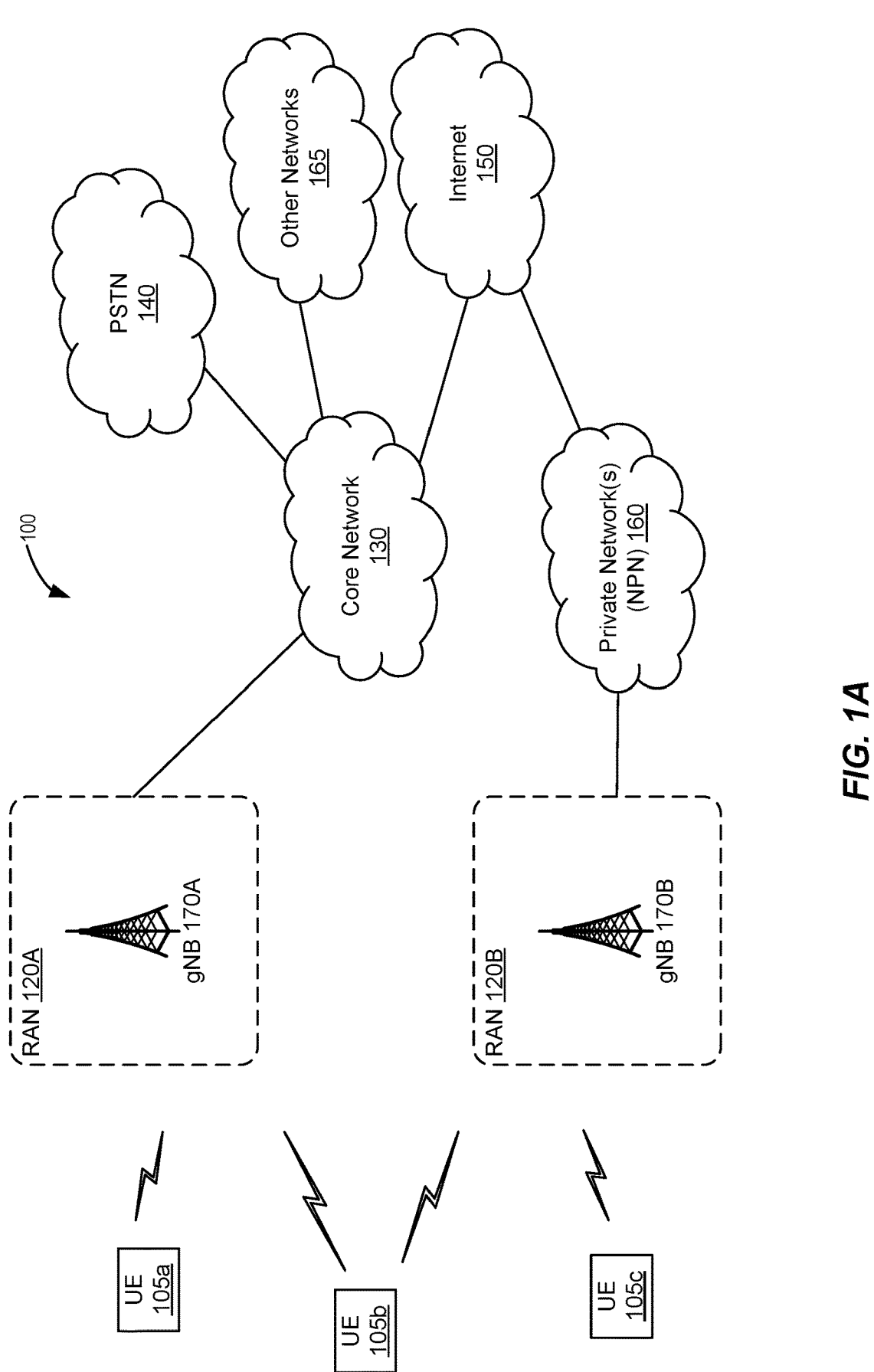
FIG. 1A illustrates one example of a communication system.

The present disclosure and embodiments address onboarding congestion in onboarding networks. The disclosure presents systems and methods for reducing congestion in onboarding networks, including non-public networks (NPNs) and Public Land Mobile Networks (PLMN) before onboarding and provisioning connections are made by user equipment (UE), and for reducing congestion in onboarding networks after attempts are made by UEs to make connections to onboarding networks for onboarding and provisioning which result in network congestion. In embodiments, UE network selection is optimized for onboarding in order to avoid unauthorized UEs from flooding the onboarding network. Embodiments include new broadcast information (referred to herein as "onboarding access control information") from the radio access network (RAN) to user equipment (UE), in order to guide onboarding UEs to detect and access the right onboarding network (including, for example, an onboarding Stand Alone Non-Public Network (O-SNPN)), to prevent unnecessary network access attempts by UEs which are not authorized to access an onboarding network for onboarding. In other embodiments, network control for onboarding after the network congestion occurs are presented.

In implementations, a radio access network coupled to an onboarding network receives, from a management system, onboarding access control information for one or more Subscription Owners (SOs). The onboarding access control information may comprise one or more of an allowed SO list, a group identifier, a SO-Block list, a group block list, or various combinations of the allowed SO list, group identifier, SO-Block list and/or SO group block list. The UE receives from a radio access network communicating with an onboarding network, onboarding access control information. The onboarding access control information defines the availability of the onboarding network for onboarding the UE based on the SO associated with the UE. Also disclosed is network control for onboarding to reduce congestion after network congestion occurs. A radio access network receives, from a management system, onboarding access control information for one or more SOs and after network congestion is determined, access to onboarding through the onboarding network is controlled.

Congestion can occur in the RAN when large numbers of onboarding UEs are trying to access the RAN for initial onboarding and provisioning. Existing solutions support the ability of, for example, an O-SNPN to broadcast information in a System Information Block (SIB) to indicate whether an SNPN is an O-SNPN. However, in the existing solution, there is no SO information broadcast. Thus, all the UEs in the coverage area of a given network which require onboarding will try to access the network having coverage in the area given its indication that it is an O-SNPN. This may result in UEs belonging to different SOs which are not supported by a given O-SNPN trying to register with the O-SNPN. These unsupported UEs will be rejected but may keep trying on this network. These retries and initial access attempts will cause congestion on this NPN. This may further result in UEs belonging to this O-SNPN being prevented from accessing the network because of attempts by the unsupported onboarding UEs, especially if there are overlaps between the O-SNPN and the other SNPN. Compared to a fully provisioned UE which may be configured with policies to handle the congestion, an onboarding UE is configured with very limited default information and without other specific registration/congestion handling policies. Thus, when network congestion occurs, the large number of onboarding UEs will continue repeating the network access attempts, then eventually worsen the network congestion conditions. While solutions exist for PLMNs, no solutions exist for SNPNs. The embodiments described herein reduce this network congestion thereby improving onboarding efficiency for SNPNs and PLMNs.

It is understood that the present embodiments of the disclosure may be implemented in many different forms and that claims scopes should not be construed as being limited to the embodiments set forth herein. Rather, these embodiments are provided to convey the inventive embodiment concepts to those skilled in the art. Indeed, the disclosure is intended to cover alternatives, modifications, and equivalents of these embodiments, which are included within the scope and spirit of the disclosure as defined by the appended claims. Furthermore, in the following detailed description of the present embodiments of the disclosure, numerous specific details are set forth in order to provide a thorough understanding. However, it will be clear to those of ordinary skill in the art that the present embodiments of the disclosure may be practiced without such specific details.

FIG. 1A illustrates a wireless network for communicating data. The communication system 100 includes, for example, user equipment 105a-105c, radio access networks (RANs) 120A-120B, a core network 130, a public switched telephone network (PSTN) 140, the Internet 150, a Non-public Network (NPN) 160 (also referred to herein as a private network) and other networks 165 (such as PLMNs). Additional or alternative networks include private and public data-packet networks including corporate intranets. While certain numbers of these components or elements are shown in the figure, any number of these components or elements may be included in the system 100.

In one embodiment, the wireless network may be a fifth generation (5G) network including at least one 5G base station which employs orthogonal frequency-division multiplexing (OFDM) and/or non-OFDM and a transmission time interval (TTI) shorter than 1 ms (e.g., 100 or 200 microseconds), to communicate with the communication devices. In general, a base station may also be used to refer any of the eNB and the 5G BS (gNB). In addition, the network may further include a network server for processing information received from the communication devices via the at least one eNB or gNB.

System 100 enables multiple wireless users to transmit and receive data and other content. The system 100 may implement one or more channel access methods, such as but not limited to code division multiple access (CDMA), time division multiple access (TDMA), frequency division multiple access (FDMA), orthogonal FDMA (OFDMA), or single-carrier FDMA (SC-FDMA).

The user equipment (UE) 105-105c are configured to operate and/or communicate in the system 100. For example, the user equipment 105-105c are configured to transmit and/or receive wireless signals or wired signals. Each user equipment 110A-110C represents any suitable end user device and may include such devices (or may be referred to) as a user equipment/device (UE), wireless transmit/receive unit (WTRU), mobile station, fixed or mobile subscriber unit, pager, cellular telephone, smartphone, laptop, computer, touchpad, wireless sensor, or consumer electronics device.

In the depicted embodiment, the RANs 120A-120B include one or more base stations 170A, 170B (collectively, base stations 170), respectively. Each of the base stations 170 is configured to wirelessly interface with one or more of the UEs 105-105c to enable access to the core network 130, the PSTN 140, the Internet 150, NPN 160 and/or the other networks 165. For example, the base stations (BSs) 170 may include one or more of several well-known devices, such as a base transceiver station (BTS), a Node-B (NodeB), an evolved NodeB (eNB), a next (fifth) generation (5G) NodeB (gNB), a Home NodeB, a Home eNodeB, a site controller, an access point (AP), or a wireless router, or a server, router, switch, or other processing entity with a wired or wireless network.

In one embodiment, the base station 170A forms part of the RAN 120A, which may include other base stations, elements, and/or devices. Similarly, the base station 170B forms part of the RAN 120B, which may include other base stations, elements, and/or devices. Each of the base stations 170 operates to transmit and/or receive wireless signals within a particular geographic region or area, sometimes referred to as a "cell." In some embodiments, multiple-input multiple-output (MIMO) technology may be employed having multiple transceivers for each cell.

The base stations 170 communicate with one or more of the user equipment 105-105c over one or more air interfaces (not shown) using wireless communication links. The air interfaces may utilize any suitable radio access technology.

It is contemplated that the system 100 may use multiple channel access functionality, including for example schemes in which the base stations 170 and user equipment 105-105c are configured to implement the Long-Term Evolution wireless communication standard (LTE), LTE Advanced (LTE-A), and/or LTE Broadcast (LTE-B). In other embodiments, the base stations 170 and user equipment 110A-110C are configured to implement UMTS, HSPA, or HSPA+ standards and protocols. Of course, other multiple access schemes and wireless protocols may be utilized.

In the example of FIG. 1A, RAN 120A is in communication with core network 130 to provide the user equipment 105-105c with connectivity to the core network. RAN 120B is in communication with one or more private networks 160 to provide connectivity to the private network 160. As appreciated, the RANs 120A-120B and/or the core network 130 and or the private network 160 may be in direct or indirect communication with one or more other RANs (not shown). The core network 130 may also serve as a gateway access for other networks (such as PSTN 140, Internet 150, and other networks 160). In addition, some, or all of the user equipment 105-105c may include functionality for communicating with different wireless networks over different wireless links using different wireless technologies and/or protocols.

The RANs 120A-120B may also include millimeter and/or microwave access points (APs). The APs may be part of the base stations 170 or may be located remote from the base stations 170. The APs may include, but are not limited to, a connection point (a mmW CP) or a base station 170 capable of mmW communication (e.g., a mmW base station). The mmW APs may transmit and receive signals in a frequency range, for example, from 6 GHz to 100 GHz, but are not required to operate throughout this range. As used herein, the term base station is used to refer to a base station and/or a wireless access point.

Although FIG. 1A illustrates one example of a communication system, various changes may be made to FIG. 1A. For example, the communication system 100 could include any number of user equipment, base stations, networks, or other components in any suitable configuration. It is also appreciated that the term user equipment may refer to any type of wireless device communicating with a radio network node in a cellular or mobile communication system. Non-limiting examples of user equipment are a target device, device-to-device (D2D) user equipment, machine type user equipment or user equipment capable of machine-to-machine (M2M) communication, laptops, PDA, iPad, Tablet, mobile terminals, smart phones, laptop embedded equipped (LEE), laptop mounted equipment (LME) and USB dongles.

Figure 1B:
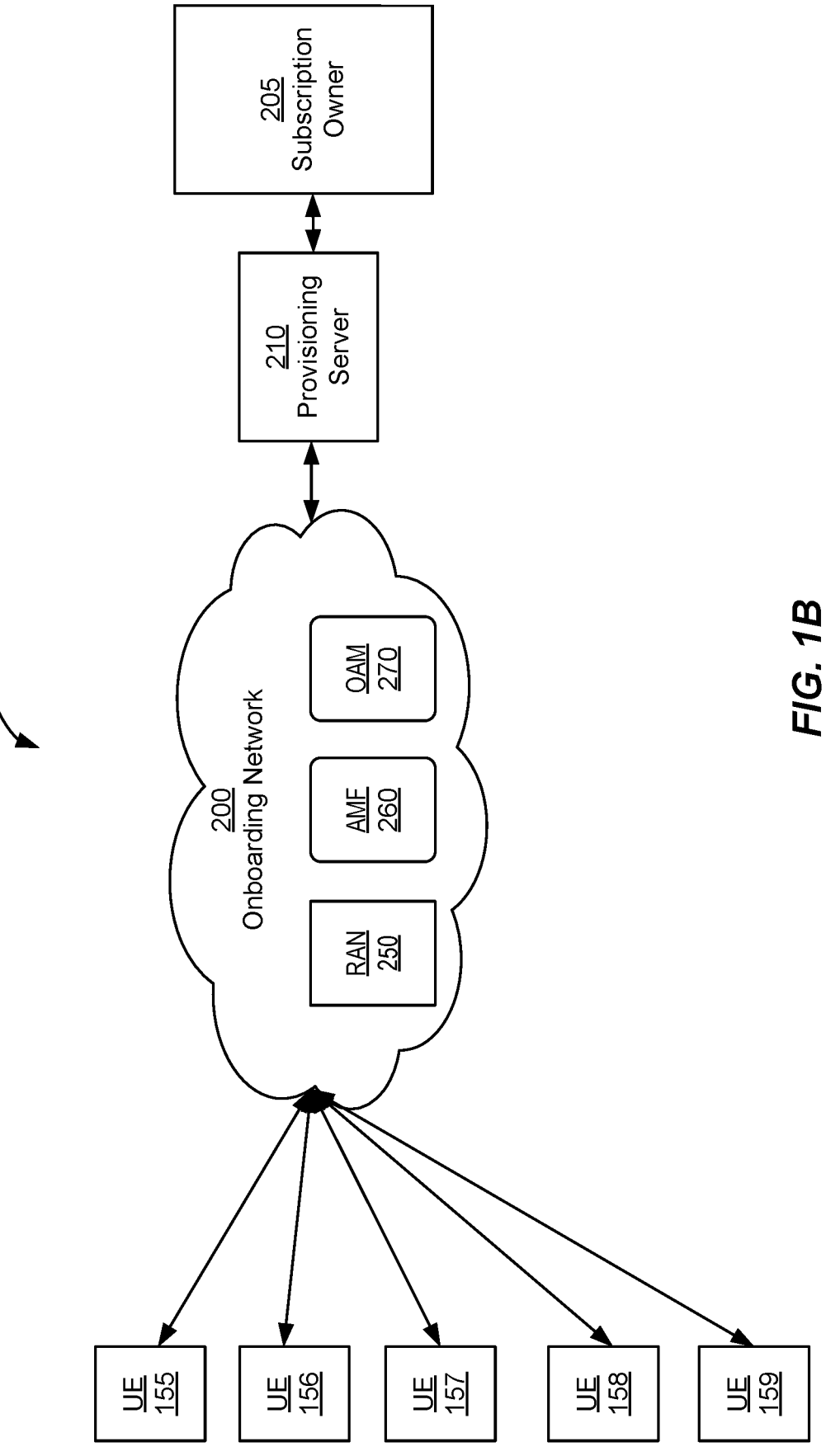
FIG. 1B illustrates one example of an onboarding and provisioning implementation for a communication system.

FIG. 1B illustrates one example of an onboarding and provisioning implementation in a system such as system 100. In FIG. 1B, the onboarding and provisioning system 100a may include a plurality of UEs 155-159 connecting to an NPN and in particular an onboarding network 200. The onboarding network may comprise an PLMN or an NPN 160 such as that illustrated in FIG. 1A, and which is in communication with one or more RANs 120. While a single onboarding network 200 is illustrated in FIG. 1B, multiple onboarding network may be provided. The onboarding network may communicate with a provisioning server 210 that provides subscription and provisioning data from an SO. The SO can be a service provider without network infrastructure which relies on other networks or can be another SNPN owner. The SO is an entity that stores, and as result of the UE Onboarding procedures provides, the subscription data and optionally other configuration information via a provisioning server 210 to the UE. The O-onboarding network and SO can be the same or different business domains. The SO stores and provides the subscription data and (optionally) other configuration information via the provisioning server 210 to the UE. The onboarding network may also provide other high priority connectivity services to other devices at the same time (There is assumption that onboarding network is not only providing onboarding services, but also provide other connectivity services).

The onboarding network may include a radio access network (RAN) 250 controlled by a radio Access and Mobility Management Function (AMF) 260, and an Operation, Administration and Management function 270 (sometimes abbreviated herein as a "management function"). The AMF 260 controls which UEs can access the onboarding network to exchange traffic with a data network and manages the mobility of UEs when they roam from one gNB to another. When a UE is outside the coverage area of an NPN or other network to which a UE needs to onboard, a UE may be allowed to obtain network connectivity via the onboarding network 200 which provides temporary connectivity between the UE and the provisioning server 210 so that the UE can be provisioned with necessary network credentials and configuration for the service provider that will own the UE's subscription (i.e., the SO).

In embodiments, the disclosure presents systems and methods for reducing congestion in onboarding networks before onboarding and provisioning connections are made by UEs and for reducing congestion in onboarding networks after attempts are made by UEs to make connections to onboarding networks for onboarding and provisioning. In embodiments, UE network selection is optimized for onboarding in order to avoid unauthorized UEs from flooding onboarding network. These embodiments include new broadcast information from the RAN to UEs in order to guide onboarding UEs to detect and access the correct onboarding network, to prevent unnecessary network access attempts by the UEs which are not authorized to access this network for onboarding. This reduces network congestion, especially in situations where a large number of UEs may be attempting to onboard within a limited geographical location.

FIGS. 2A and 2B illustrate two general methods of embodiments for reducing congestion in onboarding networks by optimizing onboarding connections. The embodiments described herein will be described with respect to an onboarding network comprising an O-SNPN, but it will be understood that the embodiments may be applied to other onboarding networks, including PMLNs. FIG. 2A illustrates a method performed by an onboarding network such as an O-SNPN. At 305, a radio access network coupled to an O-SNPN receives, from a management system (i.e., OAM 430), onboarding access control information for one or more subscription owners. As detailed below in FIGS. 4-8, the onboarding access control information may comprise one or more of an allowed UE list, a group identifier, a UE block list, a group block list, or various combinations of the allowed UE list, group identifier, UE block list and/or group block list. The onboarding access control information defines whether and how the onboarding network is available for onboarding the UE. At 310, the RAN provides the onboarding access control information which defines the availability of an O-SNPN and also sends onboarding configuration information from the SO. Step 310 may be a broadcast by the onboarding network or a unicast control message from a network function. At 315, in response to the broadcast, the RAN receives an onboarding request from a UE if the UE is allowed to make the request based on the onboarding access control information. At 320, the UE is provided with configuration information and allowed to access the onboarding network (or partner onboarding network) of the SO, or the UE is rejected by the onboarding network.

FIG. 2B illustrates a method performed by a UE for onboarding in the system of FIG. 1B. At 325, the UE receives from a radio access network communicating with an O-SNPN, onboarding access control information. The onboarding access control information defines the availability of the O-SNPN for onboarding the UE and is detailed below with respect to FIGS. 4-8. At 335, based on the onboarding access control information, the UE selects an onboarding network. At 355, the UE connects to the RAN and at 340 requests onboarding and configuration data via the O-SNPN for the SO sends an onboarding request to the O-SNPN. At 345, the UE receives the onboarding configuration information and completes onboarding for the NPN via the o-SNPN.

In other embodiments, network control for onboarding after the network congestion occurs are presented. FIG. 3 illustrates a method for network control for onboarding to reduce congestion after network congestion occurs. At 350, a radio access function receives, from a management system, onboarding configuration information and onboarding access control information for one or more SOs. At 355, network congestion is determined and at 360, access to onboarding through the O-SNPN is controlled. Embodiments for controlling access at 360 are described below with respect to FIGS. 9-13.

Figure 4:
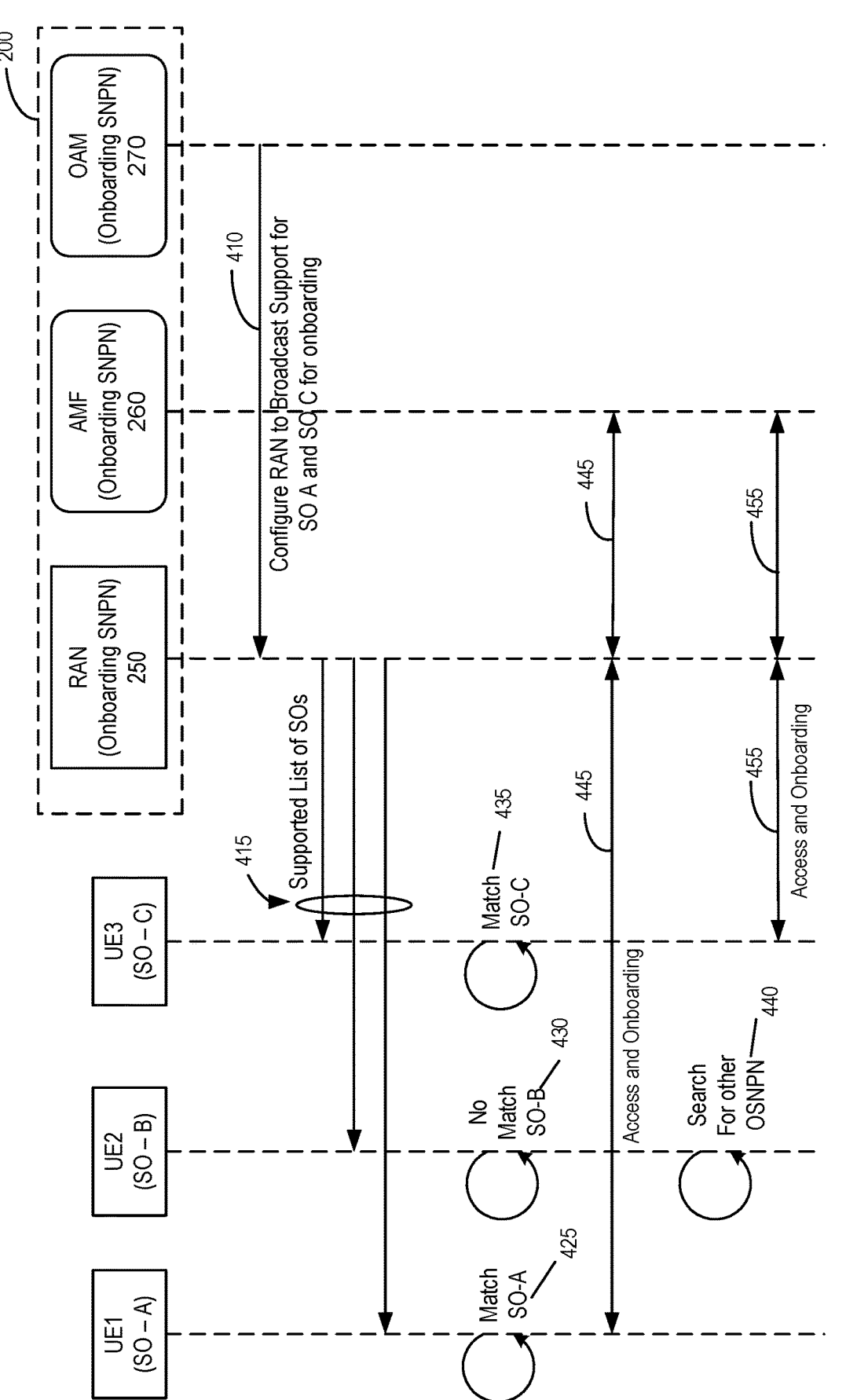
FIG. 4 illustrates a first embodiment of a congestion solution including broadcasting onboarding access information in the form a list of onboarding subscription identifier(s) (SO IDs).

FIGS. 4-8 illustrate various embodiments of using onboarding access control information to manage network congestion. While the description references an O-SNPN, it will be understood that the embodiments may be applied to other onboarding networks, including PMLNs. FIG. 4 illustrates a first embodiment of a congestion solution including broadcasting onboarding access information in the form a list of onboarding subscription owner identifier(s) (SO IDs)

to guide onboarding UEs to detect and access authorized O-SNPNs and prevent unnecessary network access attempts by UEs which are not authorized to access a given network for onboarding.

The embodiment illustrated in FIG. 4 provides a new list of onboarding subscription owner provider Identifier (e.g., SO ID) broadcast by the O-SNPN's RAN. The SO ID is an identifier of the service provider who stores and, following UE onboarding, provides the subscription data (and optionally other configuration information) via the provisioning server to the UE. In implementations, the SO can be the home service provider of UE, so the RAN can broadcast same "home" service provider list which is used for roaming services and use it for onboarding purposes. In embodiments, the SO can be different than the home service provider. In implementations, the RAN can broadcast a separate SO ID list for onboarding purposes only.

In the embodiment of FIG. 4, the O-SNPN RAN will broadcast an SO list (or SO ID list) comprising SOs with which the broadcasting O-SNPN has a relationship and for which onboarding by the broadcasting O-SNPN is supported. The broadcast includes an SIB indication of onboarding capability from this O-SNPN RAN which is defined in 3GPP SA2 TR22.700-7. If the O-SNPN supports onboarding, its RAN broadcasts the onboarding access control information (an indication that onboarding is enabled) and may also broadcast a SO-NPN list in the same Radio Resource Control (RRC) frame with that indication, or in subsequent frame. This list can be broadcast in a separate or same frame with the home NPN/PLMN list for roaming service. The embodiment can also include new information to inform UE when the UE can expect to receive the broadcast SO-NPN list information (e.g., the RAN will broadcast this list every N frame, or every X seconds, etc.).

With reference to FIG. 4, at 410, an O-SNPN's OAM 270 uses the configuration interface of the AMF 260 to configure the onboarding SO with broadcast information in the RAN 250 of O-SNPN 200. The information includes the list of SOs this O-SNPN supports. In this example, SO-A and SO-C are illustrated as supported, but any number of supported SOs may be provided. Each UE (UE1, UE2, and UE3) has a relationship with one of SO-A, SO-B and SO-C, respectively. At 415, RAN 250 uses its SIB to broadcast onboarding access information O-SNPN 200. The SIB includes the onboarding access control information indicating onboarding support, as well as a (optionally) additional indication that it also supports onboarding for other SOs and an onboarding SO list.

After receiving the SIB message, at 425, UE1 identifies O-SNPN as the network which it can access for onboarding because SO-A is in the SO list broadcast by RAN. At 445 it will perform access and onboarding by connecting to RAN 250. At 430, after receiving the SIB message, UE2 identifies this O-SNPN is not the network it can access for onboarding because SO-B is not in the SO list broadcast by RAN. UE2 will try to select another network for onboarding at 440. At 435, after receiving the SIB message, UE3 identifies O-SNPN is the network it can access for onboarding because SO-C is in the SO list broadcast by RAN, and it will begin access and onboarding at 455.

Figure 5:
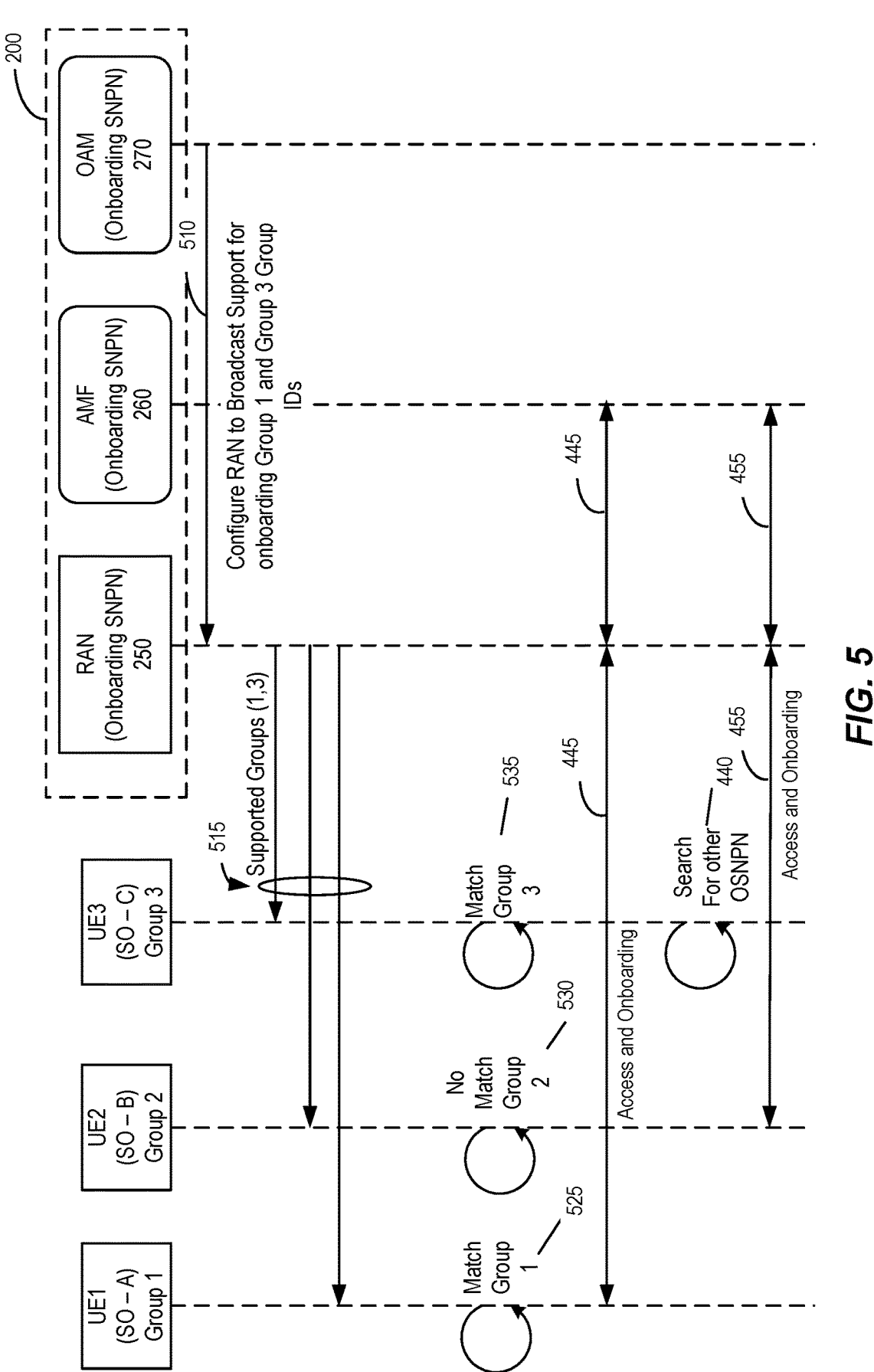
FIG. 5 illustrates another embodiment for managing network congestion broadcasting groups of SOs supported for onboarding.

FIG. 5 illustrates another embodiment for managing network congestion by broadcasting groups of SOs supported for onboarding. The embodiment of FIG. 5 may utilize onboarding access control information in the form of a group identifier (group ID) for an onboarding SO provider group in which onboarding of all members of group is supported by this O-SNPN. Each group ID may be any combination of alpha-numeric characters or bits which is associated with the group of SOs. The RAN can broadcast different onboarding group IDs which are supported for onboarding via SIB or may broadcast the individual SO provider IDs. Although an onboarding UE requires onboarding configuration information, the UE nevertheless may be preconfigured with a default configuration which includes a group ID to identify groups within the group ID list broadcast by the O-SNPN. If the group ID is within the default configuration list, the onboarding UE will know it can access this RAN for onboarding.

With reference to FIG. 5, at 510, an O-SNPN's OAM 280 uses the configuration interface of the AMF 270 to configure the onboarding SO to broadcast onboarding access control information indicating support for onboarding groups 1 and 3 using a group ID in the RAN 250 of O-SNPN 200. In this example, support for groups 1 and 3 is illustrated, but any number of supported groups may be provided. Each UE (UE1, UE2, and UE3) has a default group configuration with one of group 1, group 2, and group 3. respectively. At 515, RAN 250 uses its SIB to broadcast onboarding groups 1 and 3 for O-SNPN 200. The SIB includes the indication of supporting onboarding, as well as additional indication that it also supports onboarding the groups.

After receiving the SIB message, at 525, UE1 identifies a match with group 1 in the SIB information and that O-SNPN is the network which it can access for onboarding. At 445 (in a manner equivalent to step 445 of FIG. 4) it will perform access and onboarding by connecting to RAN 250. At 530, after receiving the SIB message, UE2 determines that its group is not supported by this O-SNPN for onboarding because its group ID in the group ID broadcast by RAN 250. UE2 will try to select another network for onboarding at 440. At 535, after receiving the SIB message, UE3 determines that its group ID matches the broadcast group IDs for O-SNPN 200 and that it can access O-SNPN for onboarding, and it will begin access and onboarding at 455.

Figure 6:
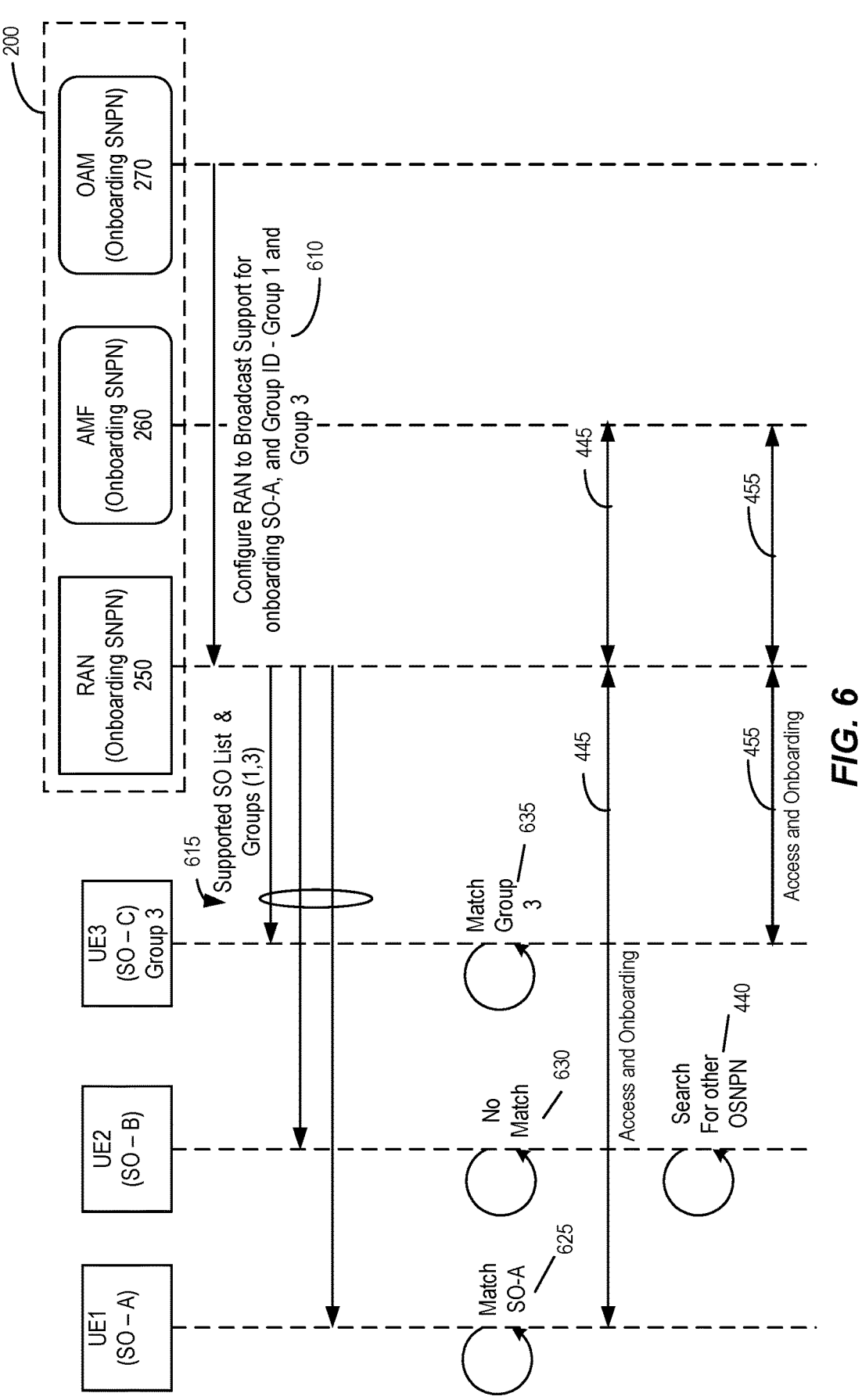
FIG. 6 illustrates an embodiment which combines the embodiments of FIGS. 4 and 5.

FIG. 6 illustrates an embodiment which combines the embodiments of FIGS. 4 and 5. At 610, an O-SNPN's OAM 280 uses the configuration interface of the AMF 270 to configure the onboarding SO with broadcast onboarding access control information in the RAN 250 of O-SNPN 200. The onboarding access control information includes the list of SOs this O-SNPN supports as well as the onboarding group IDs supported, which in this example includes groups 1 and 3. Also in this example, SO-A is in the list of supported SOs. Each UE (UE1, UE2, and UE3) has a relationship with one of SO-A, SO-B and SO-C, respectively, and UE3 also has a default configuration identifying group ID for group 3 as supporting onboarding. At 515, RAN 250 uses its SIB to broadcast this onboarding access control information for O-SNPN 200.

After receiving the SIB message, at 625, UE1 identifies a match with SO-A in the broadcast list. UE2 determines there is no match with either the group ID or the list at 630. UE3 determines at 635 that its group ID matches the broadcast group IDs for O-SNPN 200 and that it can access O-SNPN for onboarding, and it will begin access and onboarding at 455.group 1 in the SIB information and that O-SNPN is the network which it can access for onboarding. UE1 and UE3 will perform access and onboarding by connecting to RAN 250 at 445 and 455, respectively.

Figure 7:
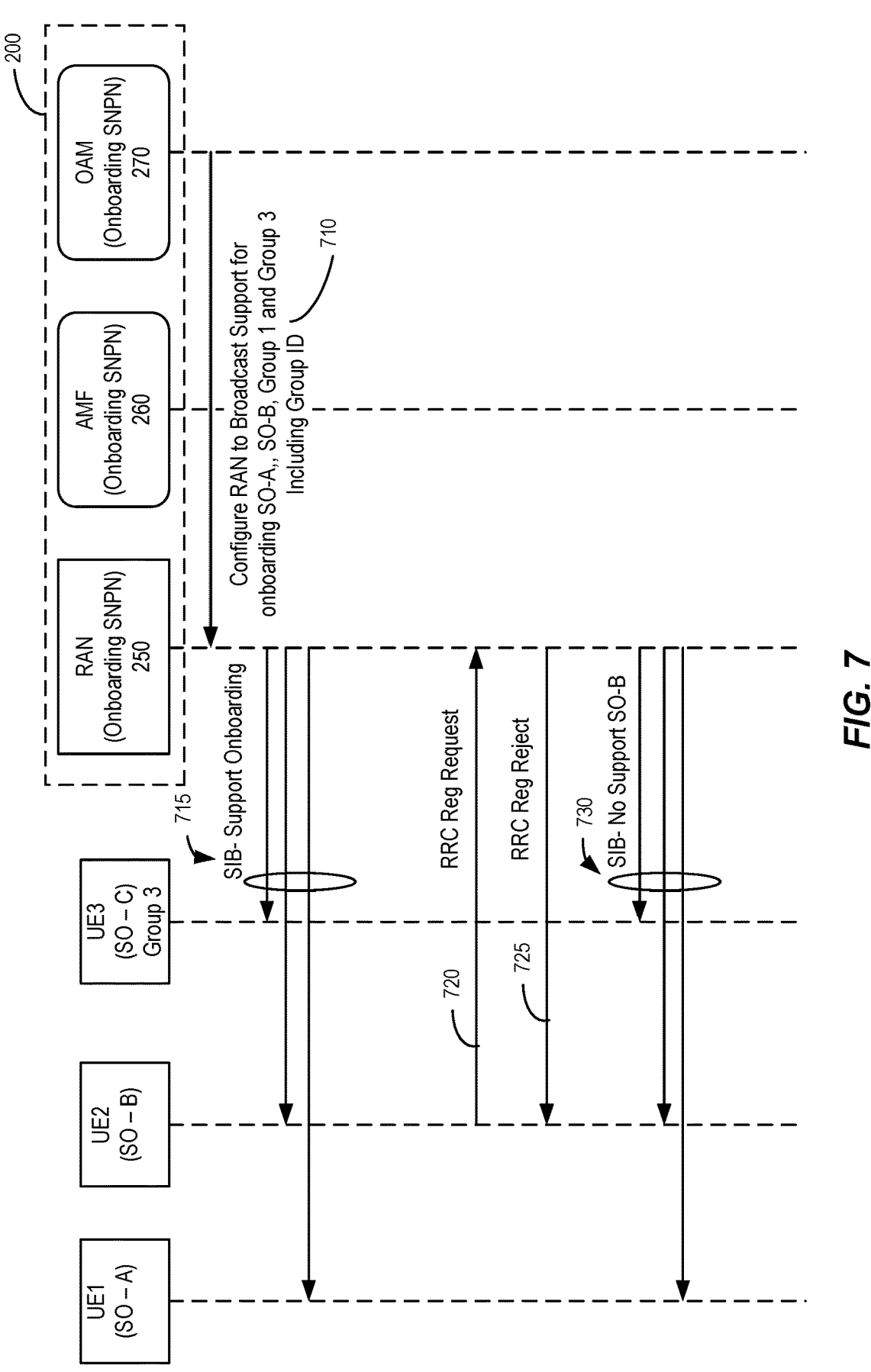
FIG. 7 illustrates another embodiment for managing onboarding congestion where a full list of supported SOs is too large to broadcast.

FIG. 7 illustrates another embodiment for managing onboarding congestion. The embodiment illustrated in FIG. 7 may be used in cases where, for example, a full list of supported SOs which may be broadcast in the embodiments of FIG. 4 or 6 may be too long for a RAN to broadcast. As such, in this embodiment, the RAN broadcasts onboarding access control information in the form of a list of SOs which are not supported by O-SNPN 250 using its SIB message. This list can be broadcast or updated after the RAN rejects an access request from a UE from the non-supported SO. When other UEs belonging to that non-supported SO receive this SIB message and detect that their SO provider is in the non-supported list, they will not attempt to access this network. This non-supported provider list can be applied to a general network selection mechanism, where a network will broadcast the non-support providers with associated UEs which have tried to access the network but were rejected.

With reference to FIG. 7 at 710, the O-SNPN's OAM 270 uses the configuration interface of the AMF 260 to configure the RAN 250 to support onboarding UEs. The onboarding access control information includes the list of SO this O-SNPN is supporting as well as the onboarding groups. At 715, RAN 250 uses its SIB to broadcast an indication of onboarding support by the network. At 720, UE2 tries to access O-SNPN with RRC registration request message including its SO information. At 725, the RAN 450, based on the onboarding information from OAM at 710, identifies that SO-B is not supported by this network and RAN 250 sends RRC reject message to UE2 at 725. At 730, in order to prevent other UEs from SO-B from trying to access this O-SNPM 200, RAN 250 will broadcast onboarding access control information in the form of an indication that SO-B onboarding is not supported using SIB.

Figure 8A:
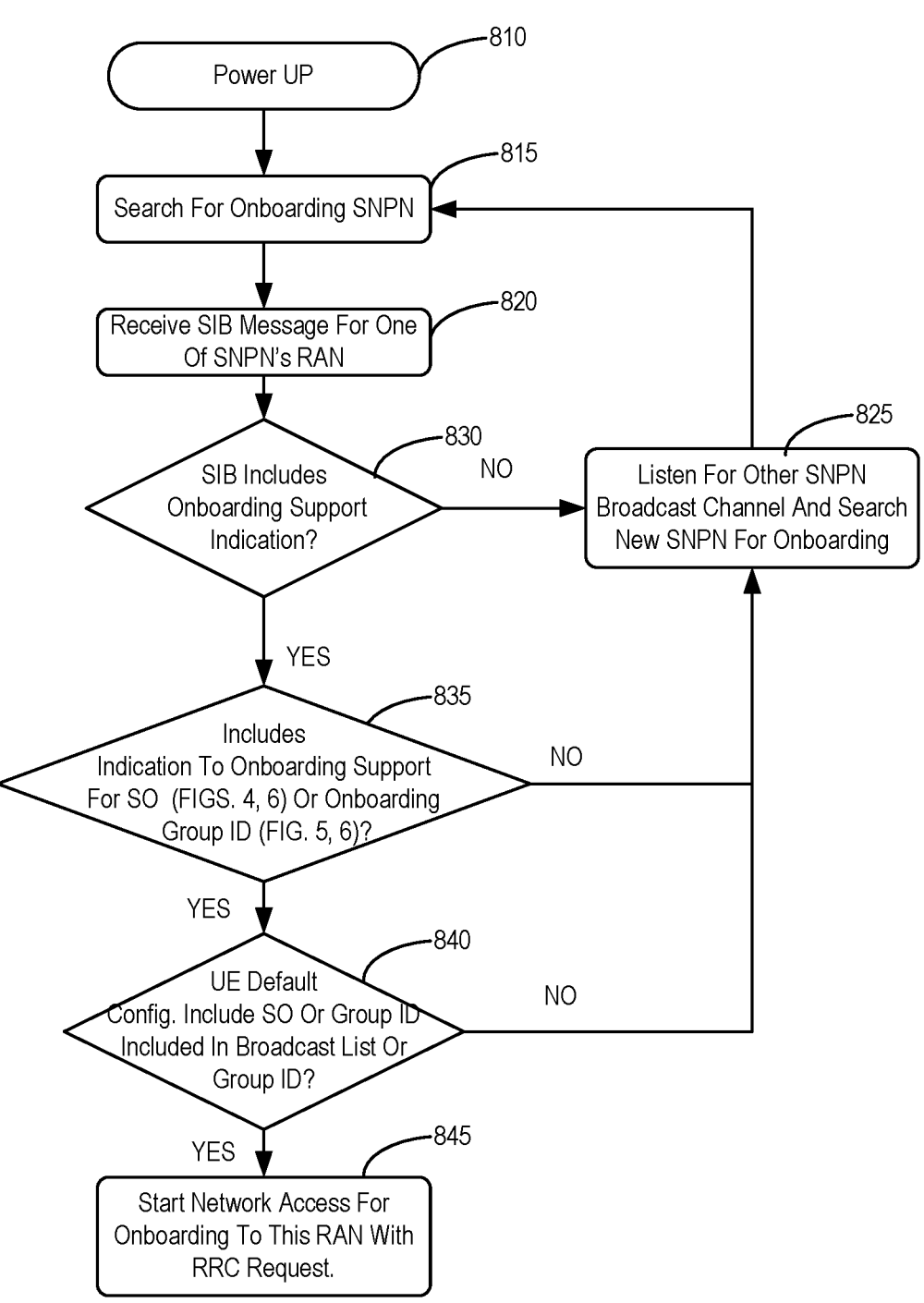
FIG. 8A illustrates a method performed by a UE in accordance with the foregoing embodiments of FIGS. 4-6.

FIG. 8A illustrates a method performed by a UE in accordance with the foregoing embodiments of FIGS. 4-6. FIG. 8A is a more detailed implementation of the method of FIG. 2B. After power up at 810, a UE will search for an O-SNPN at 815. At 820, it will receive an SIB message for an SNPN's RAN. If the SIB message does not include onboarding support information, the UE will listen for other SNPNs broadcasting at 825 and search for a new SNPN for onboarding. If the SIB message does include onboarding support indication at 830, then at 835, the UE will look for an onboarding access control information with an indication of onboarding support for the UE's SO (as in FIGS. 4 and 6) or support for onboarding based on the group ID with which the UE is configured (as in FIGS. 5 and 6). If not, the UE will listen for other SNPN broadcast channels and search for a new SNPN for onboarding at 825. If onboarding support for the UE's SO or group ID is found at 835 in the broadcast message, then the UE determines at 840 whether the support list or group ID matches it's SO or default group ID configuration at 840. If not, the UE will listen for other SNPN broadcast channels and search for a new SNPN for onboarding at 825. If the UE's SO or group ID matches one of the SO support list or group ID in the broadcast, the UE begins network access for onboarding to the RAN with an RRC request.

Figure 8B:
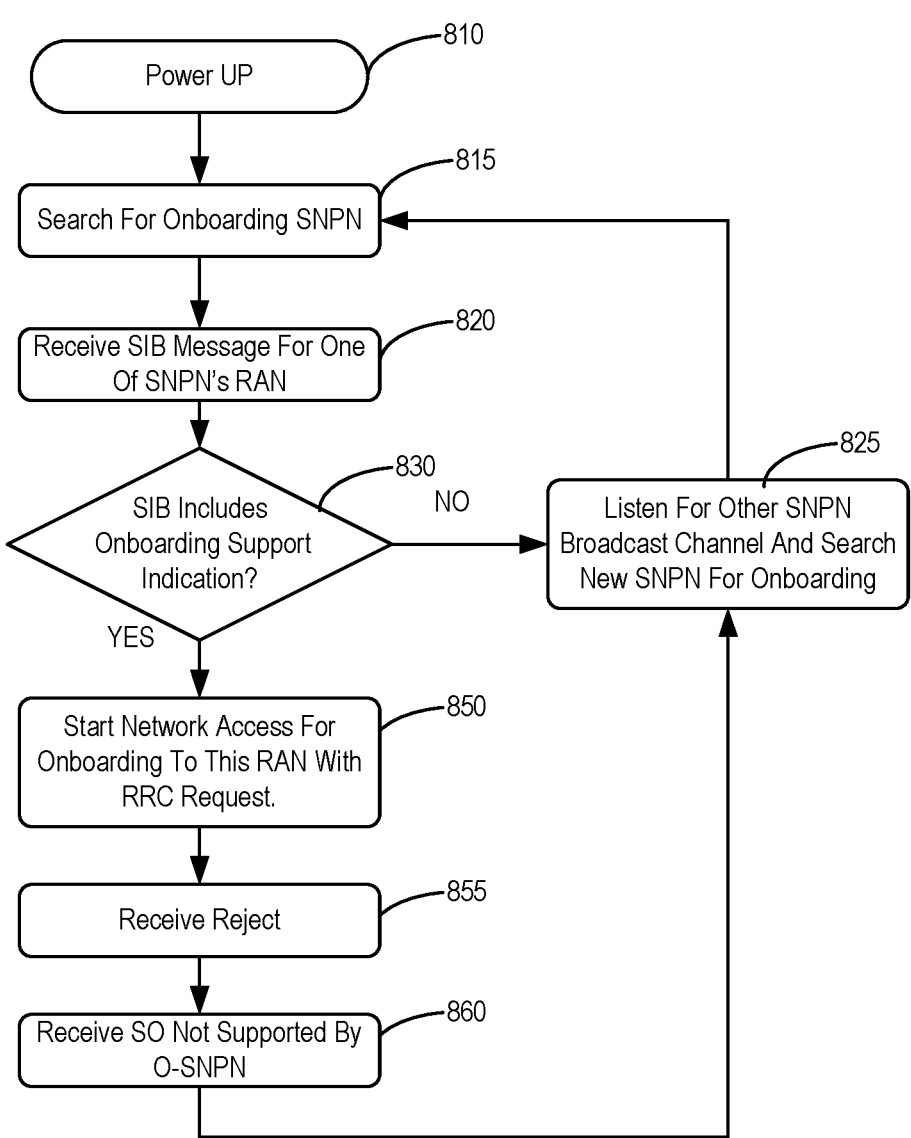
FIG. 8B Illustrates a method performed by a UE in accordance with the embodiment of FIG. 7.

FIG. 8B Illustrates a method performed by a UE in accordance with the embodiment of FIG. 7. FIG. 8B may be considered an alternative to the method of FIG. 2B where steps 325 and 335 of FIG. 2B are not performed. Steps 810-830 are equivalent to those discussed above with respect to FIG. 7. If the SIB message does include onboarding support indication at 830, then at 850, the UE will begin network access for onboarding to the RAN with an RRC request. If the RRC is not supported by the O-SNPN, the UE will receive an RRC rejection at 855 based on the onboarding access control information in the RAN and a further message at 860 that the SO associated with the UE is not supported for onboarding by this O-SNPN.

FIGS. 9-12 indicate further embodiments for managing congestion during onboarding which may be implemented after congestion in the network occurs. Embodiments are disclosed with different congestion control policies which can be broadcast by the onboarding network (described herein with respect to an O-SNPN) and can control different SO's UEs access to the O-SNPN. It will be understood that the embodiments may be applied to onboarding networks other than O-SNPNs, including PMLNs.

Figure 9:
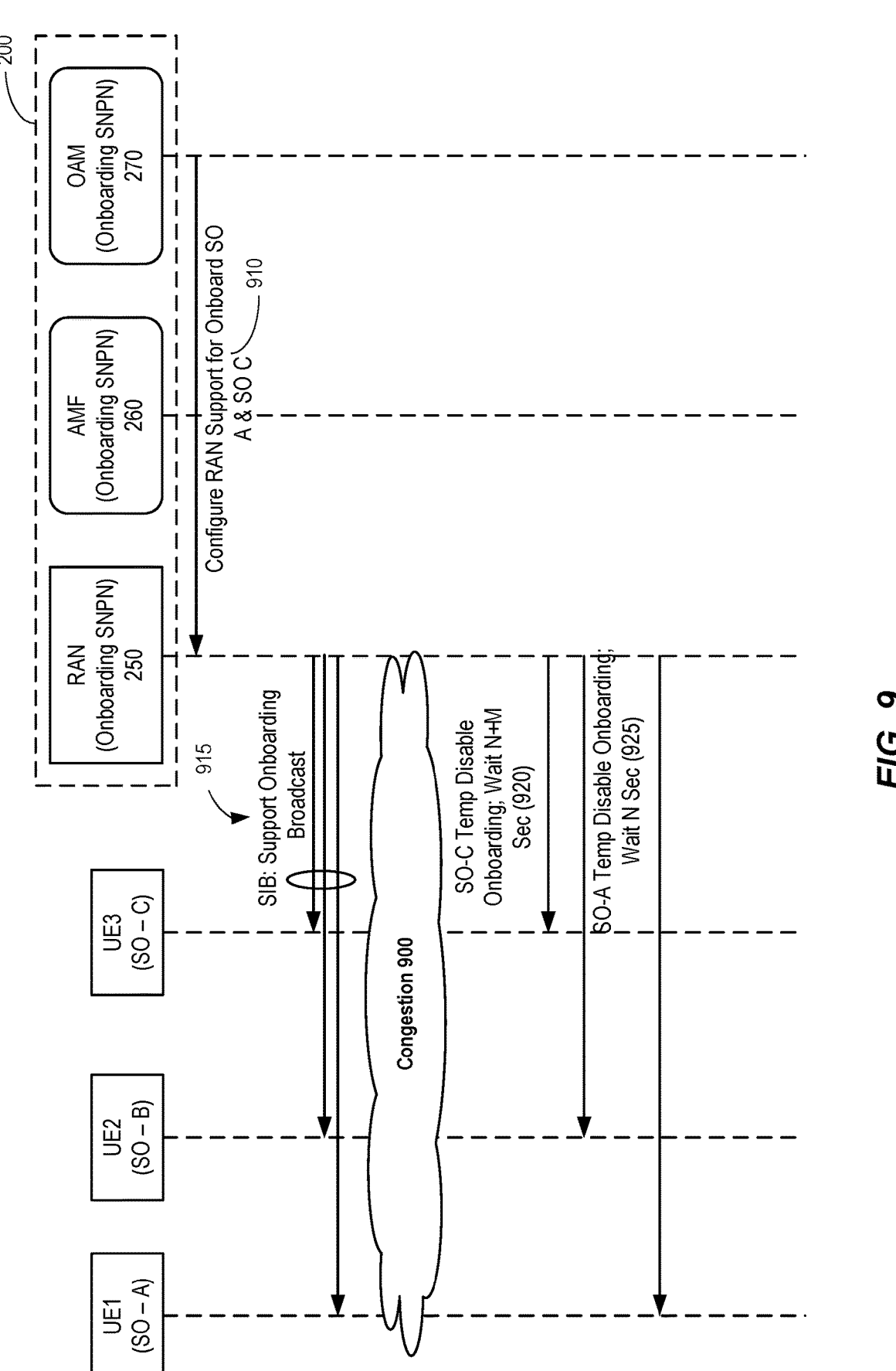
FIG. 9 illustrates a method where congestion control information is broadcast along with an SO ID in order to control access by UEs belonging to certain SO providers.

FIG. 9 illustrates a method where onboarding access control information in is broadcast along with an SO ID in order to control access by UEs belonging to certain SO providers. An embodiment as illustrated in FIG. 9 includes onboarding access control information such as a delay timer associated with different SOs which indicates to UEs associated with the SO that they should wait before attempting to onboard. The delay timer indicates how long the UE belonging to a particular SO needs to wait before registering to the O-SNPN after detecting and selecting this O-SNPN for onboarding.

With reference to FIG. 9, at 910, the OAM 270 sends onboarding access control information to RAN 250 via the AMF 260. The onboarding access control information which includes information on control policies for the UEs of each SO supported by the O-SNPN. In this example, the control policies indicate the onboard support is provided for SO-A and SO-C, along with control policies for each of SO-A and SO-C. In alternative embodiments, other SOs are supported and not all SOs need have control policies associated with the SO. At 915, the RAN 250 SIB broadcast indicates that O-SNPN 200 supports onboarding for NPNs. At 900, congestion occurs. At 920 and 925, RAN 250 broadcasts SIB information on onboarding, including onboarding access control information to restrict the UEs of some SOs (in this case SO-A and SO-C) from accessing the network. For SO-A, at 920 onboarding services may be temporarily disabled UE1 of SO-A should wait N seconds to retry or re-listen to the SIB for a further update (where N is any number of seconds). For SO-A, at 925, onboarding services may be temporary disabled UE2 of SO-C should wait N+M seconds (longer than N) to retry or re-listen to the SIB of RAN 250 for a further update.

Figure 10:
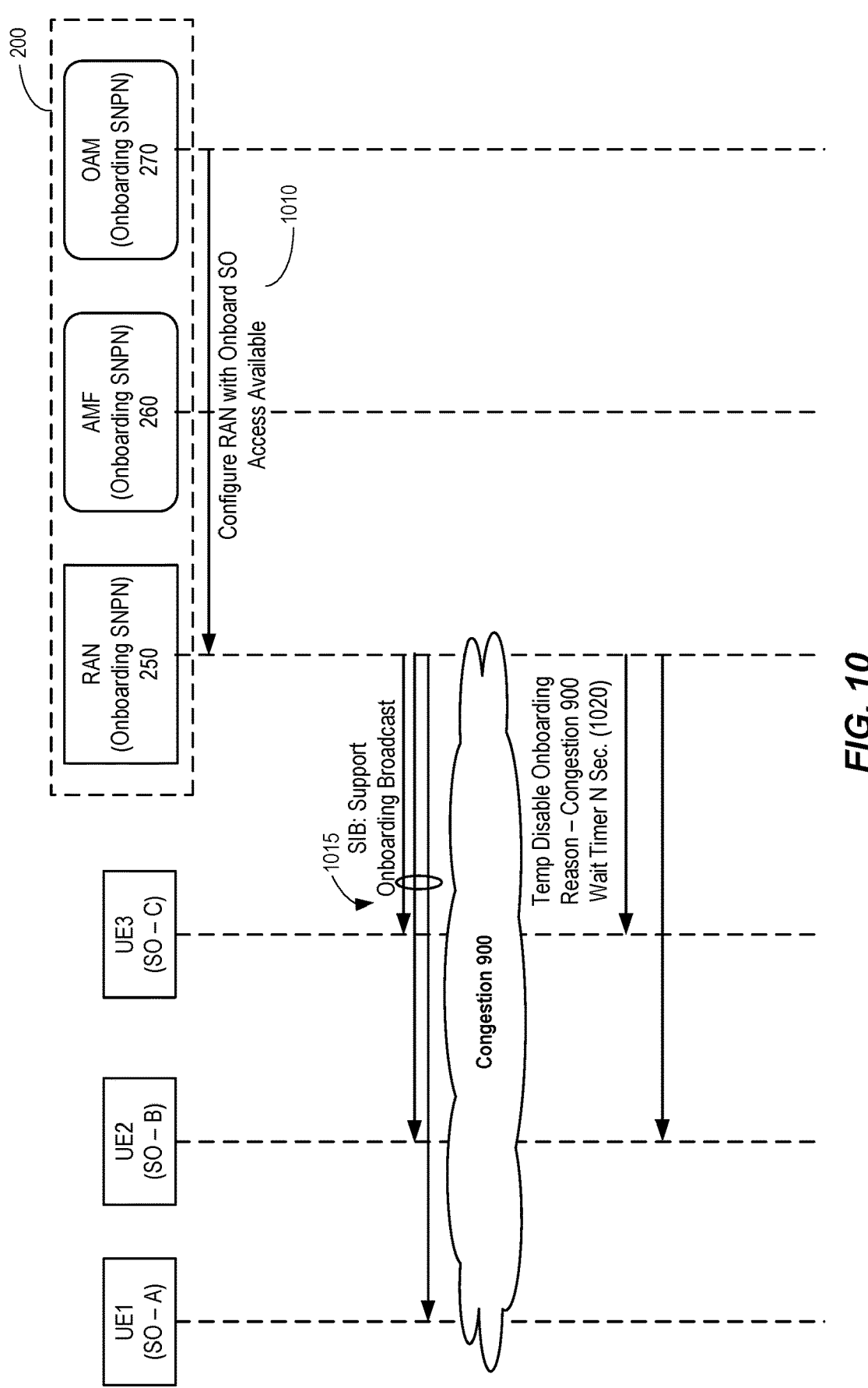
FIG. 10 illustrates another embodiment of a method where congestion control information is broadcast along with the SO ID in order to control access by UEs.

FIG. 10 illustrates another embodiment where onboarding access control information is broadcast along with the SO ID in order to control access by UEs following network congestion. In this embodiment, onboarding can be temporarily disabled for all UEs. At 1010, the OAM 270 sends configuration information to RAN 250 via the AMF 260 which indicates onboarding is supported for UEs of each SO supported by the O-SNPN. In this example, no priority or blocking of SOs is configured, but in alternative embodiments, the configuration may be similar to that of FIG. 9 or FIG. 11 below. At 1015, the RAN 250 SIB broadcast indicates that O-SNPN 250 supports onboarding of UEs for NPNs. At 900, congestion occurs. At 920 and 925, RAN 250 broadcasts SIB information on onboarding, including onboarding access control information to restrict the UEs of some SOs (in this case SO-A and SO-C) from accessing the network. The onboarding access control information broadcast at step 1020 may include a notification that the restriction is temporary and may include a wait timer. The UEs may re-try connection to the O-SNPN after expiration of the wait timer.

Figure 11:
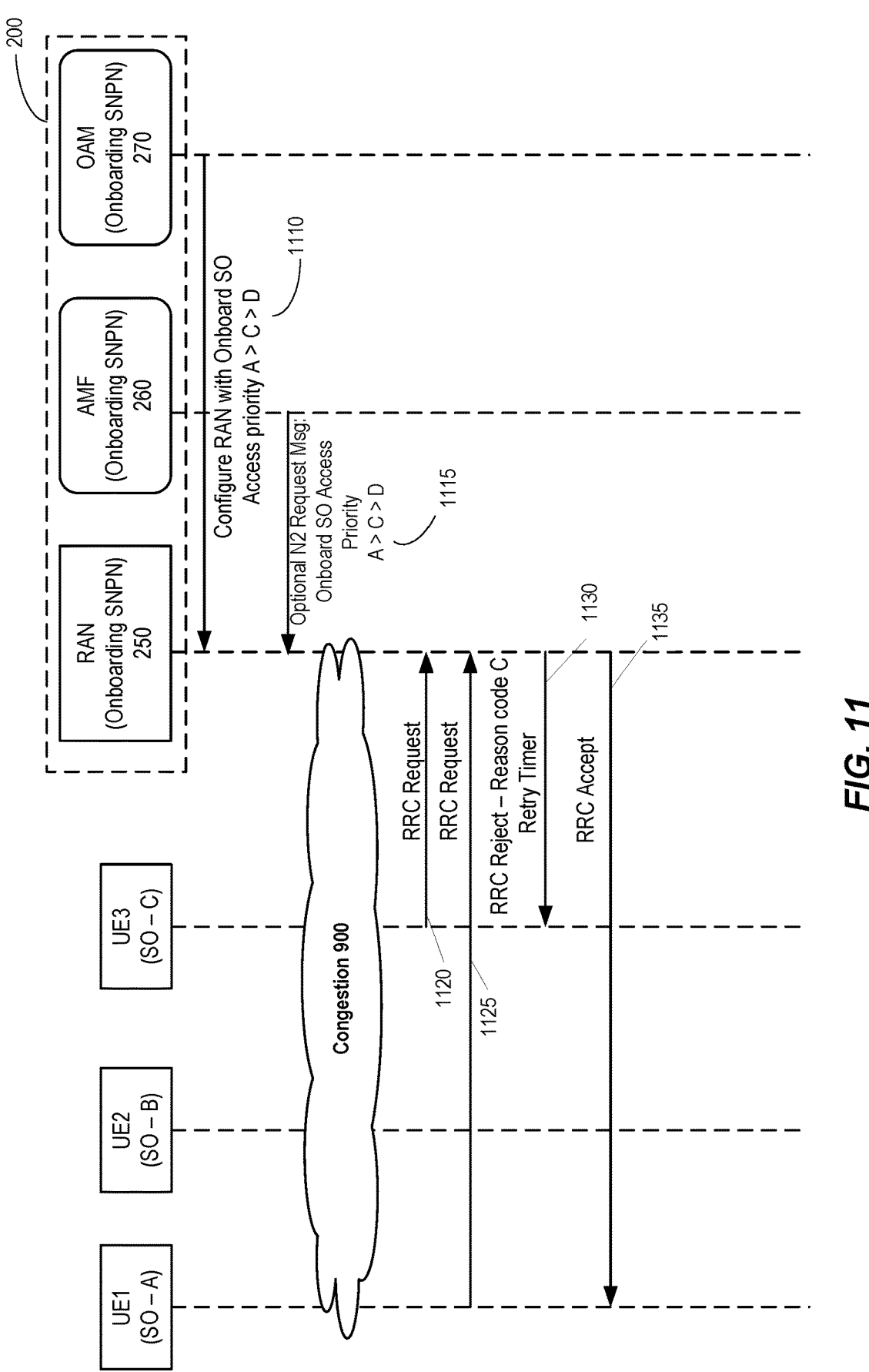
FIG. 11 illustrates another embodiment of a method for congestion control after congestion is detected utilizing access priority for SOs.

FIG. 11 illustrates another embodiment of a method for congestion control after congestion is detected. This embodiment includes onboarding access control information comprising an indication from the OAM 270 to RAN 250 which specifies access priority for different SOs. The priority list can be simple list of SO IDs with a priority order, e.g., the SO ID listed on the top of the list has highest priority while the last one has the lowest priority. Alternatively, each SO ID is assigned a priority value (for example, a lower number may indicate a higher priority or vice-versa). Based on the priority, RAN 250 may then control the access order of different onboarding UEs which belong to different SOs. The priority indication can be carried over a control message between OAM and RAN, or via another control message between 5G core elements (not illustrated) and RAN 250. In one alternative, the N2 request control message between RAN 250 and AMF 260 is used.

With reference to FIG. 11, at 1110, the OAM 270 sends onboarding access control information to RAN 250 specifying the priority of handling the onboarding UEs belongs to different SOs, or different onboarding group IDs. In this example, the priority is, from highest to lowest, SO-A, SO-B then SO-C e.g. A, C, D. Optionally, AMF 260 may also send N2 request to change or update the priority of onboarding SOs. When RAN congestion occurs at 900, at steps 1120 and 1125, both UE1 and UE3 respectively attempt to access O-SNPN 200 for onboarding by sending an RRC request. If RAN 250 can only handle a limited number of onboarding UEs, RAN 250 determines, based on its capacity, which UEs to reject and rejects UE requests based on priority. In FIG. 11, because SO-A has a higher priority and UE1 is associated with SO-A, and the capacity dictates one UE must be rejected, UE3 is rejected at 1130 and RAN 250 sends an RRC accept to UE 1 at 1135. The rejection may specify a reason code and a retry timer.

Figure 12:
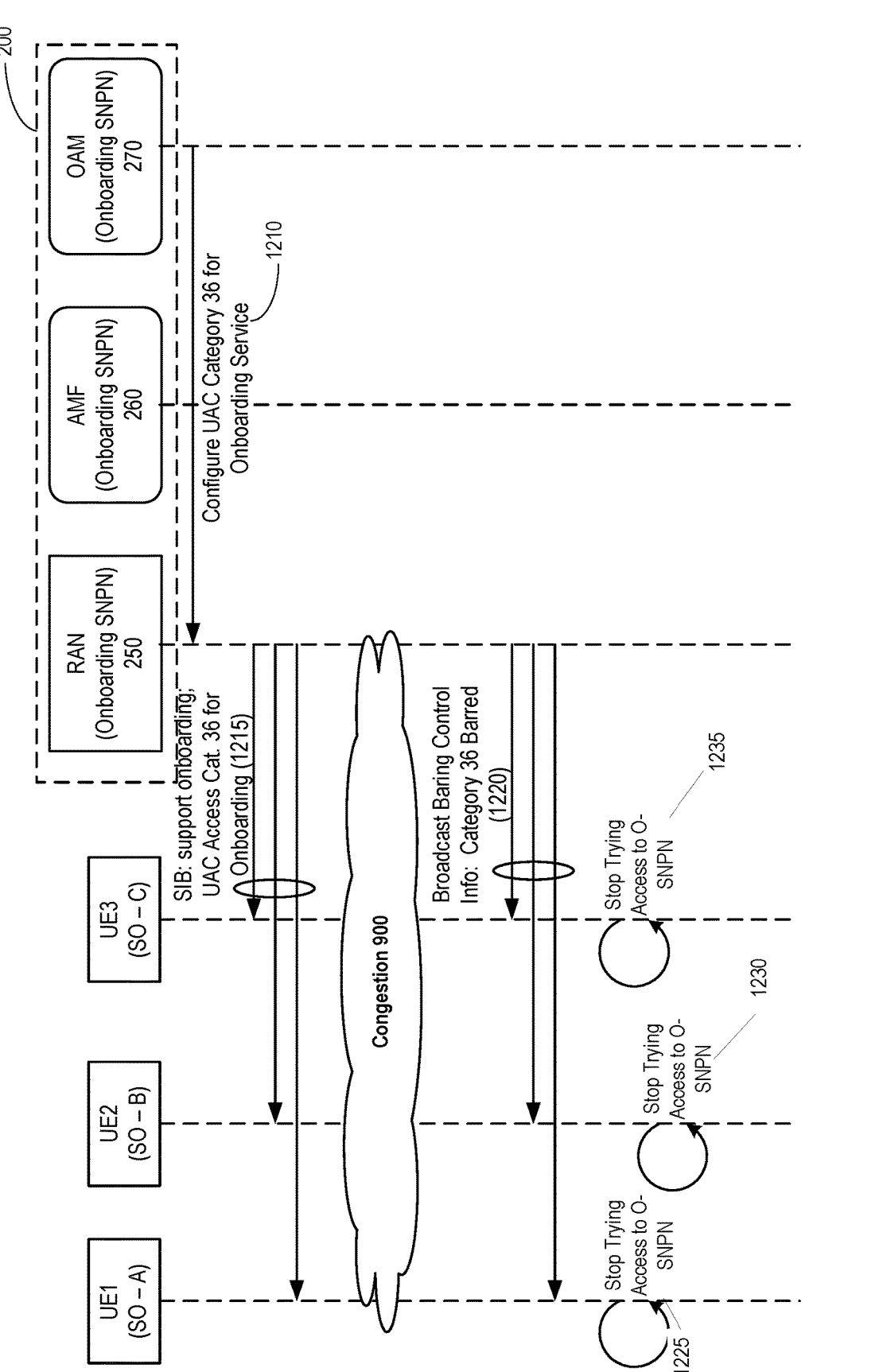
FIG. 12 illustrates an embodiment of a method which includes a new standardized access control category in Unified Access Control (UAC) for onboarding.

FIG. 12 illustrates an embodiment of a method which includes a new standardized access control category in Unified Access Control (UAC) for onboarding. UAC is an access control mechanism which provides for RRC request rejection. The UAC procedure performs an access barring check for 5GS access attempts associated with given access categories upon requests from the RRC layer. A 5G network can broadcast barring control information (i.e., a list of barring parameters associated with an Access Identity and an Access Category) in an SIB. The UE can determine whether or not a particular new access attempt is allowed based on barring parameters that the UE receives from the broadcast onboarding access control information. If there is congestion in the network for onboarding, the RAN can broadcast the barring control information associated with this access category where 3GPP SA1 specifies one UAC category that is dedicated for onboarding. An alternative method without standardizing the new access control category in UAC for onboarding includes each O-SNPN deciding its own defined category ID and broadcasting this new UAC category ID via SIB message. All UEs which connect to the O-SNPN will use the same UAC category for onboarding. When congestion occurs, the RAN can broadcast the barring control information associated with this access category.

As illustrated in FIG. 12, at 1210 OAM 250 sends onboarding configuration control information to RAN 250 and defines UAC category index 36 for onboarding service. (Note that category 36 is used herein as an example—any user-defined category (currently any of categories 26-63 are open for carrier use) may be used in this embodiment.) At 1215, RAN 250 broadcasts SIB information on onboarding, including the defined UAC access category 36 for onboarding in this network. When O-SNPN congestion occurs at 900, RAN 250 at 1220 broadcasts SIB barring control information (onboarding access control information) including that category 36 is barred. After receiving the barring control information, all the onboarding UEs in this network know they belong to category 36 based on the previous SIB information and stop to try to access this O-SNPN at 1225, 1230 and 1235.

Figure 13:
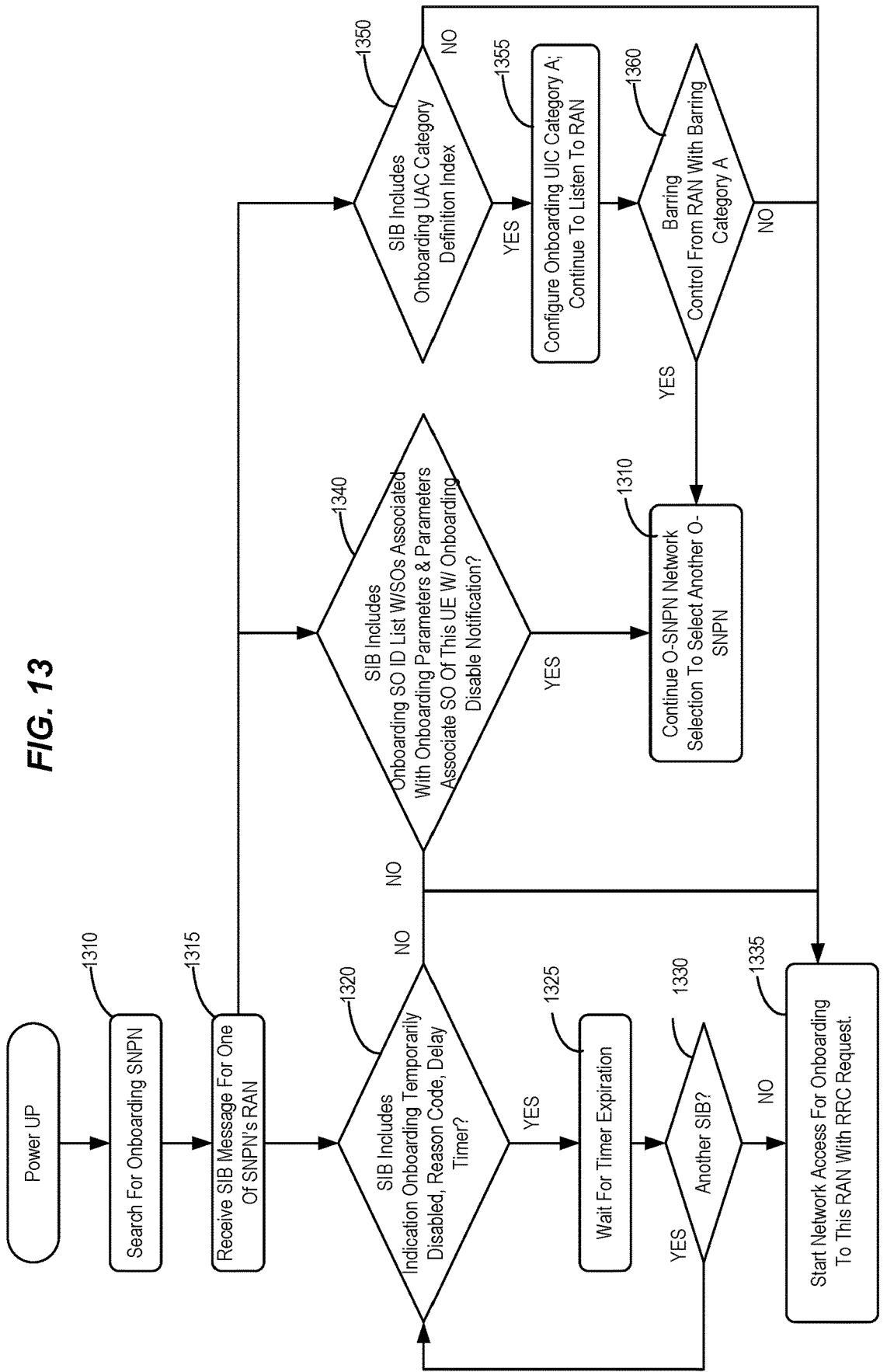
FIG. 13 is a flowchart illustrating methods performed by a UE in each of the above embodiments 9-12.

FIG. 13 illustrates methods performed by a UE in each of the above embodiments 9-12. After power up, at 1310, a UE will search for an O-SNPN and at 815 it will receive an SIB message from an SNPN's RAN. Steps 1320, 1340 and 1350 represent, respectively, the various control parameters which may be received in the embodiments of FIGS. 9/10 (Step 1320), FIG. 11 (step 1340) and FIG. 14 (step 1350).

At 1320, if the SIB message includes an onboarding access control information comprising an indication that onboarding is temporarily disabled, with or without a reason code and with a delay timer, then at 1330, the UE will wait for timer expiration and recheck for another SIB at 1330. If another SIB is received, the method loops to step 1320. If no additional SIB is received at 1330, the UE can begin the onboarding to the RAN with an RRC request at 1335. Note that the indication at step 1320 may be for all UEs (as in FIG. 10) or selected UEs based on their SO association (as in FIG. 9).

At 1340, if the SIB message includes an onboarding SO ID List with SOs associated with onboarding parameters and the parameters associate the SO of this UE with an onboarding disable notification, then the method returns to step 1310 and the UE continues to search for and select a new O-SNPN. If not, then the UE can begin network access for onboarding to the RAN at 1335.

At 1350, if the SIB message includes onboarding UAC category definition index configuration information, then at 1355, the UE configures onboarding to the UAC category and continued to listen to the RAN. If barring control information is received at 1360, then the method returns to step 1310 and the UE continues to search for and select a new O-SNPN. If not, the UE can begin the onboarding to the RAN with an RRC request at 1335.

Figure 14:
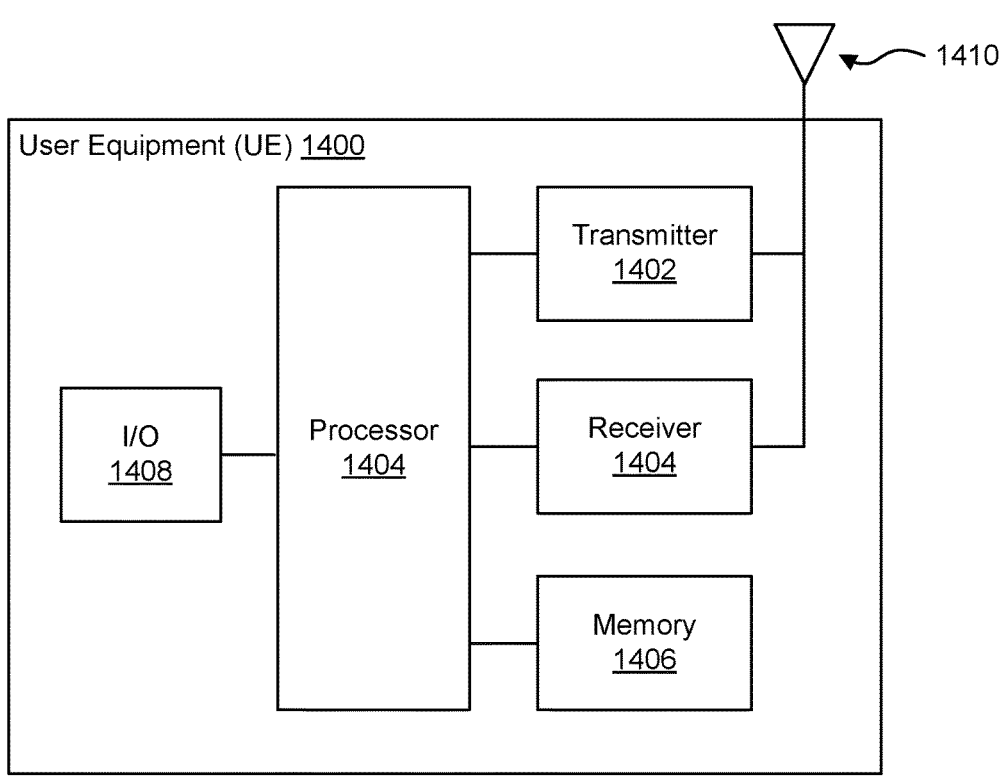
FIG. 14 illustrates an example of a UE for use in accordance with the methods and teachings according to this disclosure.

FIG. 14 illustrates an example of a UE for use in accordance with the methods and teachings according to this disclosure. As shown in FIG. 14, the UE 1400 includes at least one processor 1404. The processor 1404 implements various processing operations of the UE 1400. For example, the processor 1404 may perform signal coding, data processing, power control, input/output processing, or any other functionality enabling the UE 1400 to operate in the system 100/100*a* (FIGS. 1 & 2). The processor 1404 may include any suitable processing or computing device configured to perform one or more operations. For example, the processor 1404 may include a microprocessor, microcontroller, digital signal processor, field programmable gate array, or application specific integrated circuit.

The UE 1400 also includes at least one transceiver 1402. The transceiver 1402 is configured to modulate data or other content for transmission by at least one antenna 1410. The transceiver 1402 is also configured to demodulate data or other content received by the at least one antenna 1410. Each transceiver 1402 may include any suitable structure for generating signals for wireless transmission and/or processing signals received wirelessly. Each antenna 1410 includes any suitable structure for transmitting and/or receiving wireless signals. It is appreciated that one or multiple transceivers 1402 could be used in the UE 1400, and one or multiple antennas 1410 could be used in the UE 1400. Although shown as a single functional unit, a transceiver 1402 may also be implemented using at least one transmitter and at least one separate receiver.

The UE 1400 further includes one or more input/output devices 1408. The input/output devices 1408 facilitate interaction with a user. Each input/output device 1408 includes any suitable structure for providing information to or receiving information from a user, such as a speaker, microphone, keypad, keyboard, display, or touch screen.

In addition, the UE 1400 includes at least one memory 1406. The memory 1406 stores instructions and data used, generated, or collected by the UE 1400. For example, the memory 1406 could store software or firmware instructions executed by the processor(s) 1404 and data used to reduce or eliminate interference in incoming signals. Each memory 1406 includes any suitable volatile and/or non-volatile storage and retrieval device(s). Any suitable type of memory may be used, such as random-access memory (RAM), read only memory (ROM), hard disk, optical disc, subscriber identity module (SIM) card, memory stick, secure digital (SD) memory card, and the like.

Figure 15:
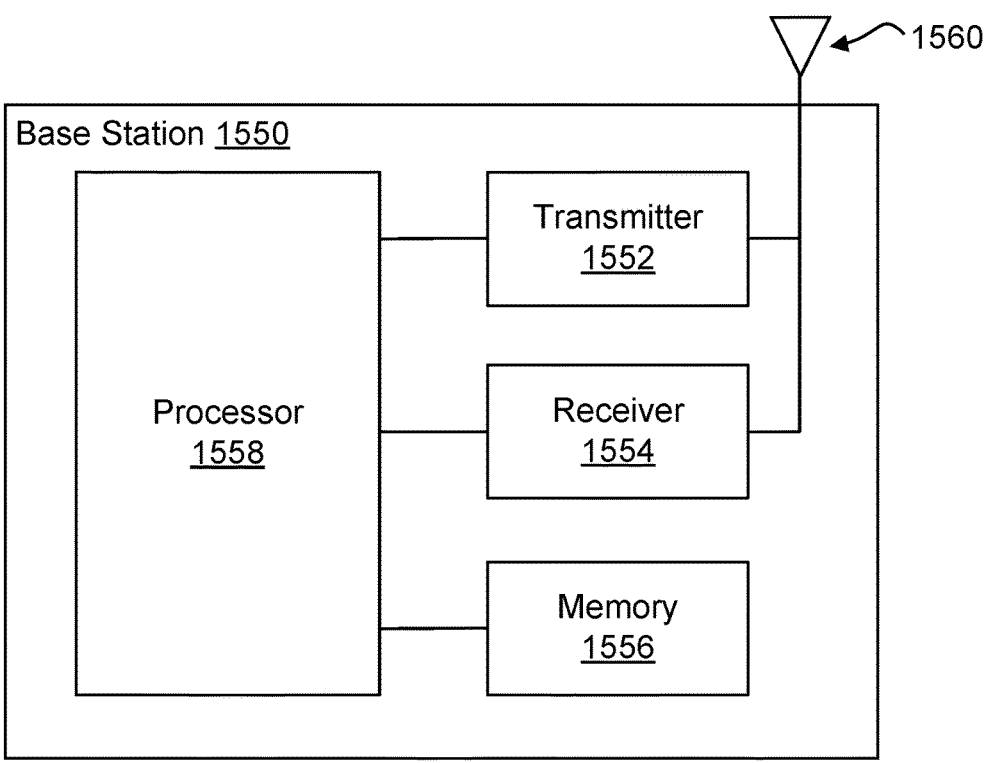
FIG. 15 illustrates example base station that may implement the methods and teachings according to this disclosure.

FIG. 15 illustrates example base station that may implement the methods and teachings according to this disclosure. As shown in FIG. 15, the base station 1550 includes at least one processor 1558, at least one transmitter 1552, at least one receiver 1554, one or more antennas 1560, and at least one memory 1556. The processor 1558 implements various processing operations of the base station 1550, such as signal coding, data processing, power control, input/output processing, or any other functionality. Each processor 1558 includes any suitable processing or computing device configured to perform one or more operations. Each processor 1558 could, for example, include a microprocessor, microcontroller, digital signal processor, field programmable gate array, or application specific integrated circuit.

Each transmitter 1552 includes any suitable structure for generating signals for wireless transmission to one or more UEs or other devices. Each receiver 1554 includes any suitable structure for processing signals received wirelessly from one or more UEs or other devices. Although shown as separate components, at least one transmitter 1552 and at least one receiver 1554 could be combined into a transceiver. Each antenna 1560 includes any suitable structure for transmitting and/or receiving wireless signals. While a common antenna 1560 is shown here as being coupled to both the transmitter 1552 and the receiver 1554, one or more antennas 1560 could be coupled to the transmitter(s) 1552, and one or more separate antennas 1560 could be coupled to the receiver(s) 1554. Each memory 1556 includes any suitable volatile and/or non-volatile storage and retrieval device(s).

Figure 16:
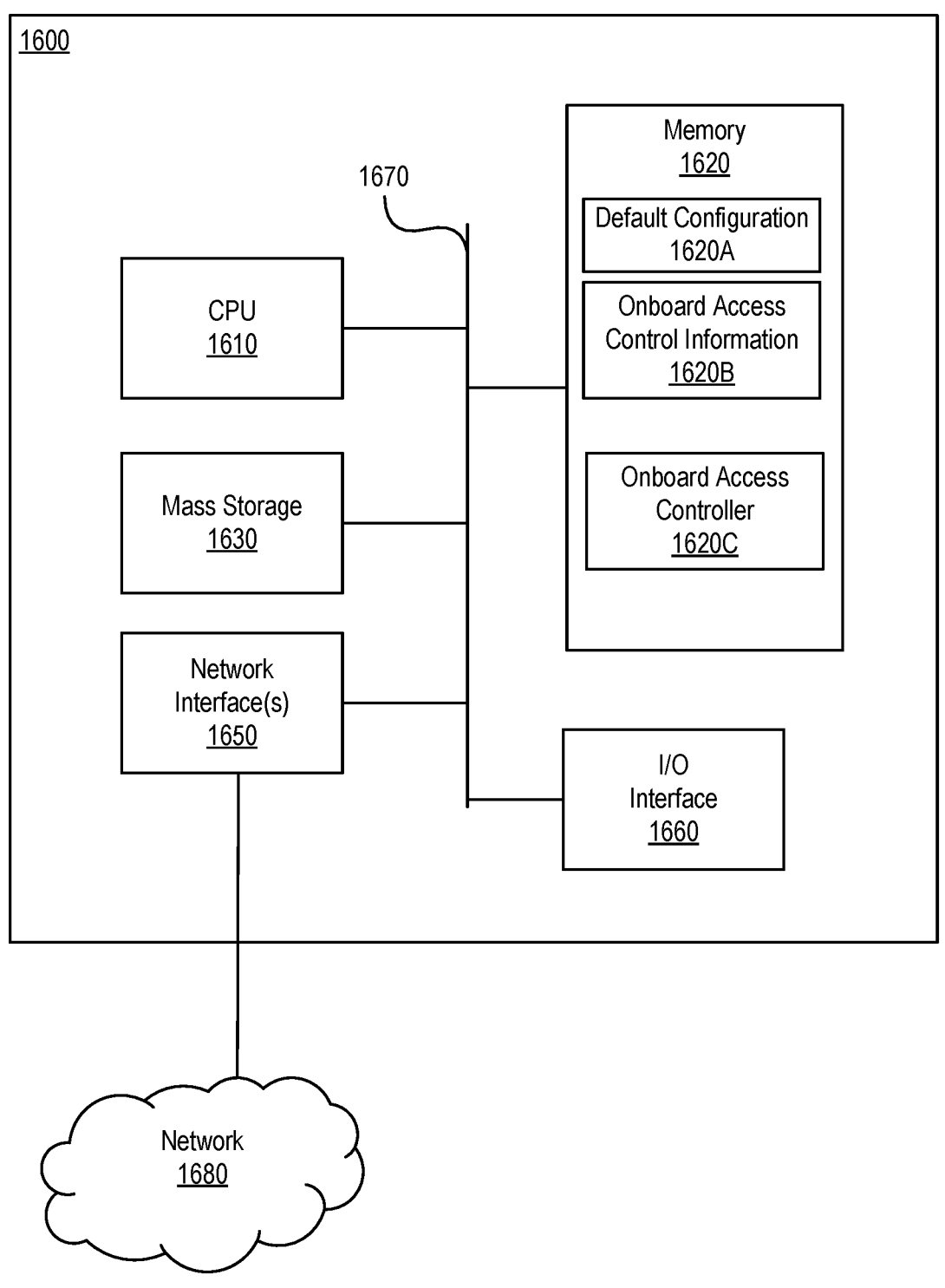
FIG. 16 is a block diagram of a network device that can be used to implement various embodiments herein.

FIG. 16 is a block diagram of a network device that can be used to implement various embodiments. Specific network devices may utilize all of the components shown, or only a subset of the components, and levels of integration may vary from device to device. Furthermore, the network device 1600 may contain multiple instances of a component, such as multiple processing units, processors, memories, transmitters, receivers, etc. The network device 1600 may comprise a processing unit 1601 equipped with one or more input/output devices, such as network interfaces, storage interfaces, and the like. The processing unit 1601 may include a central processing unit (CPU) 1610, a memory 1620, a mass storage device 1630, and an I/O interface 1660 connected to a bus 1670. The bus 1670 may be one or more of any type of several bus architectures including a memory bus or memory controller, a peripheral bus, or the like.

The CPU 1610 may comprise any type of electronic data processor. The memory 1620 may comprise any type of system memory such as static random-access memory (SRAM), dynamic random-access memory (DRAM), synchronous DRAM (SDRAM), read-only memory (ROM), a combination thereof, or the like. In an embodiment, the memory 1620 may include ROM for use at boot-up, and DRAM for program and data storage for use while executing programs. In embodiments, the memory 1620 is non-transitory. In one embodiment, the memory 1620 includes default configuration 1620A (where the device 1600 is a UE), onboarding access control information 1620B (either received from the OAM where device 1600 is part of a RAN or received from the RAN where the device is a UE), and an onboarding access controller which allows a UE to determine whether to connect to a RAN or allows a RAN to perform the congestion mitigation functions described herein.

The mass storage device 1630 may comprise any type of storage device configured to store data, programs, and other information and to make the data, programs, and other information accessible via the bus 1670. The mass storage device 1630 may comprise, for example, one or more of a solid-state drive, hard disk drive, a magnetic disk drive, an optical disk drive, or the like.

For purposes of this document, it should be noted that the dimensions of the various features depicted in the figures may not necessarily be drawn to scale.

For purposes of this document, reference in the specification to "an embodiment," "one embodiment," "some embodiments," or "another embodiment" may be used to describe different embodiments or the same embodiment.

For purposes of this document, a connection may be a direct connection or an indirect connection (e.g., via one or more other parts). In some cases, when an element is referred to as being connected or coupled to another element, the element may be directly connected to the other element or indirectly connected to the other element via intervening elements. When an element is referred to as being directly connected to another element, then there are no intervening elements between the element and the other element. Two devices are "in communication" if they are directly or indirectly connected so that they can communicate electronic signals between them.

Although the present disclosure has been described with reference to specific features and embodiments thereof, it is evident that various modifications and combinations can be made thereto without departing from scope of the disclosure. The specification and drawings are, accordingly, to be regarded simply as an illustration of the disclosure as defined by the appended claims, and are contemplated to cover any and all modifications, variations, combinations, or equivalents that fall within the scope of the present disclosure.

The technology described herein can be implemented using hardware, software, or a combination of both hardware and software. The software used is stored on one or more of the processor readable storage devices described above to program one or more of the processors to perform the functions described herein. The processor readable storage devices can include computer readable media such as volatile and non-volatile media, removable and non-removable media. By way of example, and not limitation, computer readable media may comprise computer readable storage media and communication media. Computer readable storage media may be implemented in any method or technology for storage of information such as computer readable instructions, data structures, program modules or other data. Examples of computer readable storage media include RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information, and which can be accessed by a computer. A computer readable medium or media does (do) not include propagated, modulated, or transitory signals.

Communication media typically embodies computer readable instructions, data structures, program modules or other data in a propagated, modulated, or transitory data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as RF and other wireless media. Combinations of any of the above are also included within the scope of computer readable media.

In alternative embodiments, some or all of the software can be replaced by dedicated hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), special purpose computers, etc. In one embodiment, software (stored on a storage device) implementing one or more embodiments is used to program one or more processors. The one or more processors can be in communication with one or more computer readable media/storage devices, peripherals and/or communication interfaces.

It is understood that the present subject matter may be embodied in many different forms and should not be construed as being limited to the embodiments set forth herein. Rather, these embodiments are provided so that this subject matter will be thorough and complete and will fully convey the disclosure to those skilled in the art. Indeed, the subject matter is intended to cover alternatives, modifications, and equivalents of these embodiments, which are included within the scope and spirit of the subject matter as defined by the appended claims. Furthermore, in the following detailed description of the present subject matter, numerous specific details are set forth in order to provide a thorough understanding of the present subject matter. However, it will be clear to those of ordinary skill in the art that the present subject matter may be practiced without such specific details.

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

The description of the present disclosure has been presented for purposes of illustration and description but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

For purposes of this document, each process associated with the disclosed technology may be performed continuously and by one or more computing devices. Each step in a process may be performed by the same or different computing devices as those used in other steps, and each step need not necessarily be performed by a single computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method, comprising:
receiving, by user equipment (UE) from a radio access network, onboarding access control information that comprises one or more group identifiers for network selection, each group identifier for network selection associated with one or more onboarding stand-alone non-public networks (SNPNs);
selecting, by the UE, an SNPN based on the onboarding access control information including the one or more group identifiers for network selection;
transmitting, by the UE to the radio access network, an onboarding request or a registration request for accessing the SNPN;
receiving, by the UE, an indication indicating that onboarding is temporarily disabled; and
maintaining, by the UE, a temporarily prevented list for preventing onboarding.

2. The method of claim 1, wherein the onboarding access control information further comprises an indication indicating whether UE onboarding is enabled.

3. The method of claim 1, wherein the onboarding access control information further comprises at least part of non-public network (NPN) information or a Public Land Mobile Network (PLMN) information.

4. The method of claim 1, wherein the onboarding access control information is included in a system information block (SIB) message.

5. The method of claim 1, further comprising:
receiving, by the UE from the radio access network, barring control information associated with a unified access control (UAC) category for onboarding, the barring control information indicating that the UE is barred from accessing the SNPN.

6. The method of claim 1, the selecting the SNPN comprising:
determining, by the UE, whether a group identifier of the UE match a group identifier in the one or more group identifiers for network selection.

7. The method of claim 1, wherein the onboarding access control information further comprises one or more subscription owner (SO) identifiers identifying one or more subscription owners (SOs).

8. A network device of a radio access network, comprising:
a processor, and
a non-transitory memory configured to store program instructions that, when executed by the processor, cause the network device to:
broadcast onboarding access control information for supporting user equipment (UE) onboarding, the onboarding access control information comprising one or more group identifiers for network selection, each group identifier for network selection associated with one or more onboarding stand-alone non-public networks (SNPNs);
receive, from a user equipment (UE), an onboarding request or a registration request for accessing an SNPN;
reject or allow the UE to access the SNPN; and
transmit an indication indicating that onboarding is temporarily disabled with a delay timer.

9. The network device of claim 8, wherein the onboarding access control information comprising an indication indicating whether UE onboarding is enabled.

10. The network device of claim 8, wherein the onboarding access control information further comprises at least part of non-public network (NPN) information or a Public Land Mobile Network (PLMN) information.

11. The network device of claim 8, wherein the program instructions further cause the network device to:
transmit, to the UE, barring control information associated with a unified access control (UAC) category for onboarding, the barring control information indicating that the UE is barred from accessing the SNPN.

12. The network device of claim 8, wherein the onboarding access control information further comprises one or more subscription owner (SO) identifiers identifying one or more subscription owners (SOs).

13. A user equipment (UE) device, comprising:
a processor; and
a non-transitory memory comprising program instructions that, when executed by the processor, cause the UE device to:
receive, from a radio access network, onboarding access control information that comprises one or more group identifiers for network selection, each group identifier for network selection associated with one or more onboarding stand-alone non-public networks (SNPNs);
select an SNPN based on the onboarding access control information including the one or more group identifiers for network selection;
transmit, to the radio access network, an onboarding request or a registration request for accessing the SNPN;
receive an indication indicating that onboarding is temporarily disabled; and
maintain a temporarily prevented list for preventing onboarding with a timer.

14. The UE device of claim 13, wherein the onboarding access control information further comprises an indication indicating whether UE onboarding is enabled.

15. The UE device of claim 13, wherein the onboarding access control information further comprises at least part of non-public network (NPN) information or a Public Land Mobile Network (PLMN) information.

16. The UE device of claim 13, further comprising:

receiving, by the UE from the radio access network, barring control information associated with a unified access control (UAC) category for onboarding, the barring control information indicating that the UE is barred from accessing the SNPN.

17. The UE device of claim 13, wherein the onboarding access control information further comprises one or more subscription owner (SO) identifiers identifying one or more subscription owners (SOs).

* * * * *